(12) United States Patent
Lee et al.

(10) Patent No.: US 7,155,465 B2
(45) Date of Patent: Dec. 26, 2006

(54) METHOD AND APPARATUS FOR AUTOMATICALLY ARCHIVING A FILE SYSTEM

(76) Inventors: Howard F. Lee, 55 Ettl Cir., Princeton, NJ (US) 08540; Benjamin F. Cutler, 6206 50th Ave. NE., Seattle, WA (US) 98115

( * ) Notice: Subject to any disclaimer, the term of this patent is extended or adjusted under 35 U.S.C. 154(b) by 492 days.

(21) Appl. No.: 10/420,113

(22) Filed: Apr. 18, 2003

(65) Prior Publication Data

US 2004/0210608 A1    Oct. 21, 2004

(51) Int. Cl.
*G06F 12/00* (2006.01)
*G06F 17/30* (2006.01)

(52) U.S. Cl. ...................... 707/204; 707/206
(58) Field of Classification Search ........ 707/204, 707/206, 200, 201, 1
See application file for complete search history.

(56) References Cited

U.S. PATENT DOCUMENTS

| 5,276,860 | A | * | 1/1994 | Fortier et al. | 714/6 |
| 5,276,867 | A | * | 1/1994 | Kenley et al. | 707/204 |
| 5,367,698 | A | * | 11/1994 | Webber et al. | 709/203 |
| 5,710,922 | A | * | 1/1998 | Alley et al. | 707/201 |
| 5,764,972 | A | * | 6/1998 | Crouse et al. | 707/1 |
| 5,778,390 | A | * | 7/1998 | Nelson et al. | 707/204 |
| 6,240,427 | B1 | * | 5/2001 | Szalwinski et al. | 707/204 |
| 6,546,404 | B1 | * | 4/2003 | Davis et al. | 707/204 |
| 6,609,183 | B1 | * | 8/2003 | Ohran | 711/161 |
| 6,611,850 | B1 | * | 8/2003 | Shen | 707/204 |
| 6,647,399 | B1 | * | 11/2003 | Zaremba | 707/204 |
| 6,915,314 | B1 | * | 7/2005 | Jackson et al. | 707/204 |
| 2002/0147734 | A1 | * | 10/2002 | Shoup et al. | 707/200 |
| 2004/0139128 | A1 | * | 7/2004 | Becker et al. | 707/204 |
| 2004/0167941 | A1 | * | 8/2004 | Prahlad et al. | 707/204 |

* cited by examiner

*Primary Examiner*—Sam Rimell
*Assistant Examiner*—Paul Kim
(74) *Attorney, Agent, or Firm*—Jeffrey Van Myers

(57) ABSTRACT

In a digital data processing system having an on-line file system component, a method and apparatus for archiving the contents of a selected client volume stored on the file system. The archiving is performed automatically, beginning with an initial duplication of the existing contents of the client volume into an archive volume, then continuing as changes, including additions, deletions and modifications, are made to the files comprising the client volume. Older, previously-archived versions of modified files are gracefully discarded so as to moderate the rate of growth of the archive volume. The archive volume may be used to restore the client volume, either selectively or in whole, in the event of inadvertent damage to, or loss of, files in the client volume.

34 Claims, 5 Drawing Sheets

METHOD AND APPARATUS FOR AUTOMATICALLY ARCHIVING A FILE SYSTEM

BACKGROUND OF THE INVENTION

1. Technical Field

The present invention relates generally to digital data processing systems, and, in particular, to methods and apparatus in digital data processing systems having on-line file systems for archiving the contents of one or more user volumes stored in those file systems.

2. Background Art

In general, in the descriptions that follow, we will italicize the first occurrence of each special term of art which should be familiar to those skilled in the art of digital data processing systems. In addition, when we first introduce a term that we believe to be new or that we will use in a context that we believe to be new, we will bold the term and provide the definition that we intend to apply to that term. Since our invention is specifically intended for use in digital data processing systems, we will often use terms that are well known to those skilled in this particular art. For example, with respect to an individual element of information stored at a particular address in a memory component of such a system, we will typically use the term pointer to refer, not to the element per se, but to a separate and distinct element that contains the address of the referenced element. Other common terms of art that we may use include: b for bit and B for byte, msb for most significant bit and lsb for least significant bit; and MB for megabyte. From time to time, we may refer to various commercial software products whose names may be either common law or registered trademarks of the respective owners thereof.

There are a number of products in the market which provide some form of file system protection for different kinds of failures. In general, failures can be categorized as either unrecoverable or recoverable. For example, a catastrophic failure is a failure in which the contents of one or more of the files comprising a volume or partition stored in the file system are corrupted either irretrievably or beyond the point at which it's cost effective to try to recover the contents of the disk media. In a catastrophic failure the system (or disk) is no longer operable. Such a failure can be due to hardware causes, such as a crashed disk head, or due to software causes, such as a bad OS build or virus run rampant. In contrast, a recoverable failure is a failure in which the contents of the file system are corrupted or modified incorrectly in a manner that the system (or disk) is still functional and critical portions of the file system are still intact. The most common example of a recoverable failure is when a user inadvertently deletes a file still of value.

Protection approaches protect either the current state of the file system or protect a history of the file system over time through a series of archival snapshots taken under the control of the system operators.

Approaches that protect the current state of the file system effectively provide protection against hardware failures, but nothing more. They include:

File system mirroring whereby a file system exists on two physically distinct disks or disk sets, either co-located or in geographically distinct locations. In a mirrored system, each file system write operation is done on both sets identically. If one disk or disk set fails, the other provides continuity until the failed set can be replaced and mirroring resumes.

Mirroring protects the current state of the file system from recoverable and catastrophic failures due to physical hardware failures, most notably disk crashes.

It provides no protection against failures due to software problems.

It provides no archiving of older copies of objects in the file system.

RAID disk systems interleave a file system across two or more disks operating in parallel. RAID provides higher throughput but can also provide protection against the failure of one or more disks in a manner similar to but more efficient than mirroring when a large number of disks are used. The kind of protection it provides is equivalent to that of mirroring.

Protection schemes that provide archival of snapshots operate by allowing the operator to make an image of the entire file system either upon demand or at intervals scheduled manually or automatically.

Typical schemes allow for either manual initiation of a backup or automatic initiation at a regular interval, such as once per day. In the case of a tape archive, backups are available until old tapes are recycled for use making new backups. In the case of disk, snapshots are available until they are deleted to make space for new snapshots.

To create a snapshot, the backup system copies the contents of the protected file system to archival media, either tape or another disk. At the time of each backup, the backup system can either copy the entire file system (a full save), or just those files which have changed since the last backup (incremental save), allowing a snapshot to maintain an accurate representation of the protected file system at some point in time. Some backup systems provide an explicit mechanism for keeping multiple snapshots available on a single disk media to allow easy recovery of more than a single version of a file.

Most backup systems operate by allowing the backup to take place while the system is in operation. While such a capability is favorable, it results in an imprecise image of the file system since the file system may be changing even as the backup takes place, leading not to a precise snapshot, but to an approximate snapshot taken over a potentially large interval of time, perhaps as much as several hours. This is potentially problematic, given the rapid pace at which file system contents can change. Because of this it is not always possible to restore the file system to a consistent state, even from a good snapshot, since the snapshot is a fuzzy representation of the file system captured over a relatively long period of time.

One approach to producing an exact and guaranteed usable image of a file system is to take the file system (or entire computer) offline, rendering the contents of the file system inert. Once this is a done a snapshot can be taken safe in the knowledge that the file system will remain unchanged during the entire interval required for the snapshot. We call this an offline snapshot. A significant downside to this approach is its intrusive nature, since the file system, perhaps the entire computer, is not available for use during a potentially large period of time.

With mirroring, one can take one of the two or more mirrored volumes offline and get the best of both worlds, but this is not practical for small system users.

Another approach is to use a copy-on-write method to allow taking what is effectively an offline snapshot while allowing the file system to remain accessible for use. If any files are changed while the file system snapshot is being recorded, two copies of the changed files are kept, the original or archival copy being used by the snapshot process, and the modified or live copy, used by everything else. When the snapshot concludes, the archival copy of all files modified during the snapshot are removed, leaving only the live copies.

Yet another approach is to automatically create a new snapshot or update an existing one on a very frequent basis, such as every hour or perhaps each and every time a file system object is written. We refer to this approach as continuous. A continuous approach comes closer to achieving the precision of an offline snapshot while leaving the file system available for use. Unlike the copy-on-write approach, the continuous approach allows copying data from the file system to another storage medium as it changes, reducing the window of vulnerability should something happen to the file system in between potentially infrequent snapshots. A significant problem with the continuous approach is the large storage required. As with the other approaches the storage space required grows linearly over time, since in the typical case about the same number of changes are made to the file system over any reasonable period of time. Unlike the other approaches, the amount of storage required could be dramatically greater, since we are snapshoting the file system not once per day or once per week, but potentially at each and every file system object update.

Examples of prior art in the general field of file system archiving include: Unix, Microsoft Windows backup, TLM 6.1, LiveBackup, CMS, Echo, DiskImage, NortonGhost, Dantz Retrospect, and CVS.

We submit that what is needed is a more efficient method and apparatus for efficiently archiving the contents of an on-line file system, and, in particular, wherein modified versions of existing files are archived essentially in real-time, but older, previously-archived versions of such modified files are selectively discarded.

SUMMARY OF THE INVENTION

In accordance with a preferred embodiment of our invention, we provide, in a digital data processing system having a first file storage system adapted to store a first file, a method for archiving said stored file in a second file storage system adapted to store files. In accordance with our preferred method, we first store in said second file storage system a first copy of said first file. We then store in a first record a state of a selected condition existent as of the time said first copy is stored in said second file storage system. Thereafter, we selectively apply a predetermined filter criteria to said first record, and, if said stored state of said selected condition satisfies said criteria, we delete said first copy from said second file storage system.

In accordance with another embodiment of our invention, we provide a digital data processing system having a first file storage system adapted to store a first file, and a second file storage system that is also adapted to store files. In accordance with this embodiment, we provide a storage agent that is adapted to first store in said second file storage system a first copy of said first file. The storage agent then stores in a first record a state of a selected condition existent as of the time said first copy is stored in said second file storage system. Thereafter, the storage agent selectively applies a predetermined filter criteria to said first record, and, if said stored state of said selected condition satisfies said criteria, it deletes said first copy from said second file storage system.

In accordance with yet another embodiment of our invention, we provide a storage agent for use in a digital data processing system having a first file storage system adapted to store a first file, and a second file storage system that is also adapted to store files. In accordance with this embodiment, the storage agent is adapted to first store in said second file storage system a first copy of said first file. The storage agent then stores in a first record a state of a selected condition existent as of the time said first copy is stored in said second file storage system. Thereafter, the storage agent selectively applies a predetermined filter criteria to said first record, and, if said stored state of said selected condition satisfies said criteria, it deletes said first copy from said second file storage system.

We submit that each of these embodiments of our invention more efficiently archives the contents of an on-line file system, and, in particular, that each archives modified versions of existing files essentially in real-time, while selectively discarding older, previously-archived versions of such modified files.

BRIEF DESCRIPTION OF THE SEVERAL VIEWS OF THE DRAWINGS

Our invention may be more fully understood by a description of certain preferred embodiments in conjunction with the attached drawings in which.

Figure 1:
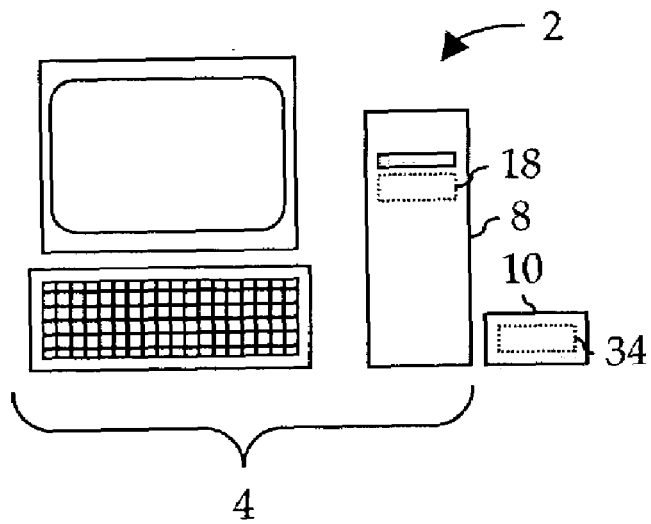
FIG. 1 is a pictorial representation of a digital data processing system including a conventional personal computer or PC, and an archival system constructed in accordance with a preferred, stand-alone embodiment of our invention.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

In accordance with our invention, one or more volumes comprising an on-line file system of a data processing system, such as a personal computer ("PC"), can be selected for automatic archival backup protection. For convenience we shall refer to the selected volume(s) as the protected volume(s). In general, the basic archival functionality of our invention is implemented in software. Although it in certainly possible, in a PC that has a single, large capacity disk drive, to partition that drive into a protected volume and an archive volume, such a configuration is subject to total failure in the event that drive experiences a catastrophic failure. Accordingly, we highly recommend that the user dedicate a separate archive drive for the archive volume. For convenience of use with an existing PC, we prefer to provide the archive drive in a separate physical enclosure from the enclosure containing the PC, and to partition the archival software such that a first portion executes within the PC enclosure and a second portion executes within the archive enclosure. One distinct advantage of such an arrangement is that a catastrophic failure of a component within the PC enclosure (e.g., a power supply failure) will not usually affect the components within the archive enclosure (and vice versa), thereby tending to facilitate rapid system recovery. On the other hand, certain efficiencies can be realized by integrating the archive drive into the PC enclosure (or, if available, dedicating an existing "spare" drive to the archive function).

The Stand-Alone Archival System

Figure 2:
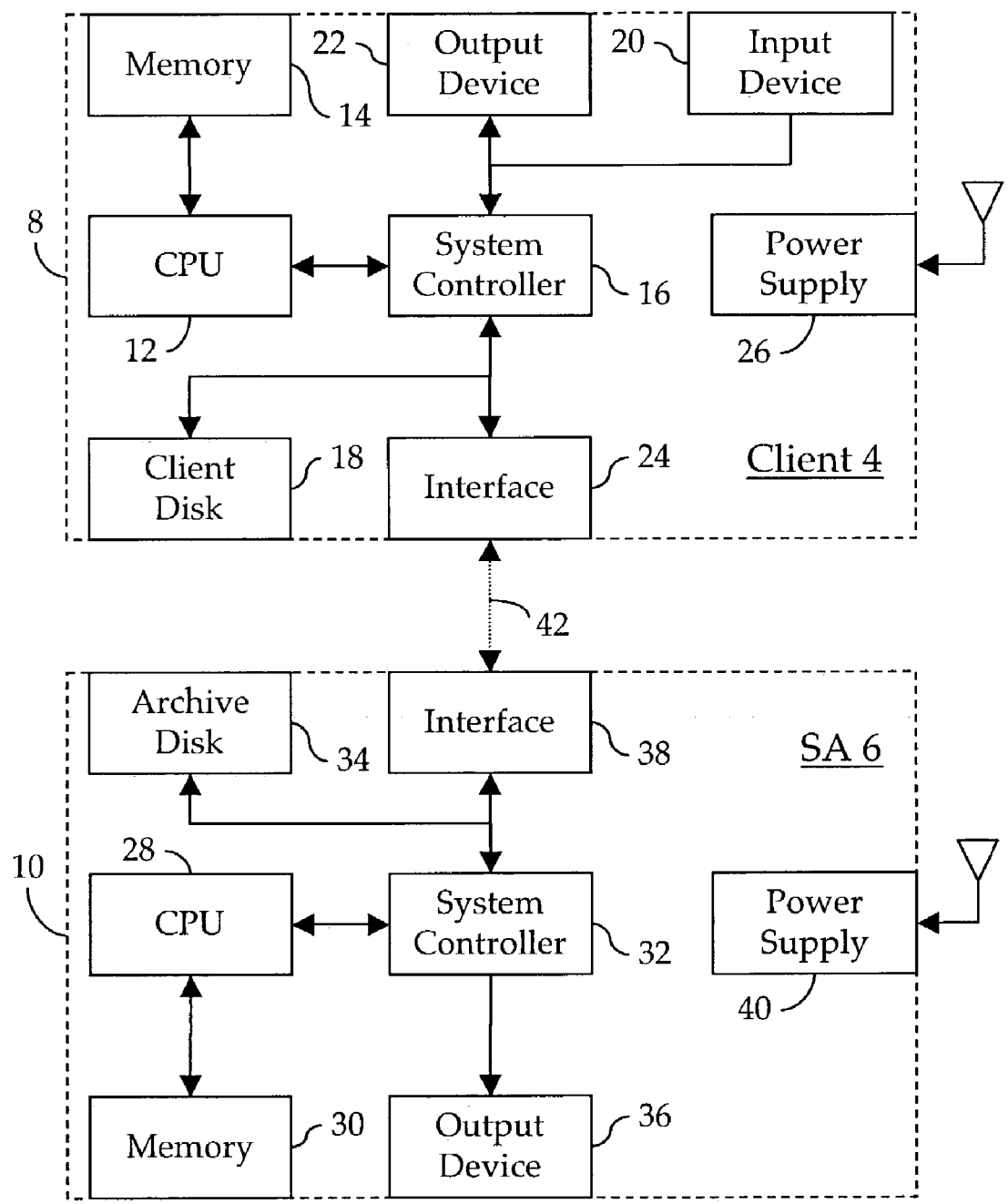
FIG. 2 is a diagrammatic representation of the main hardware components of the system shown in FIG. 1.
Figure 4:
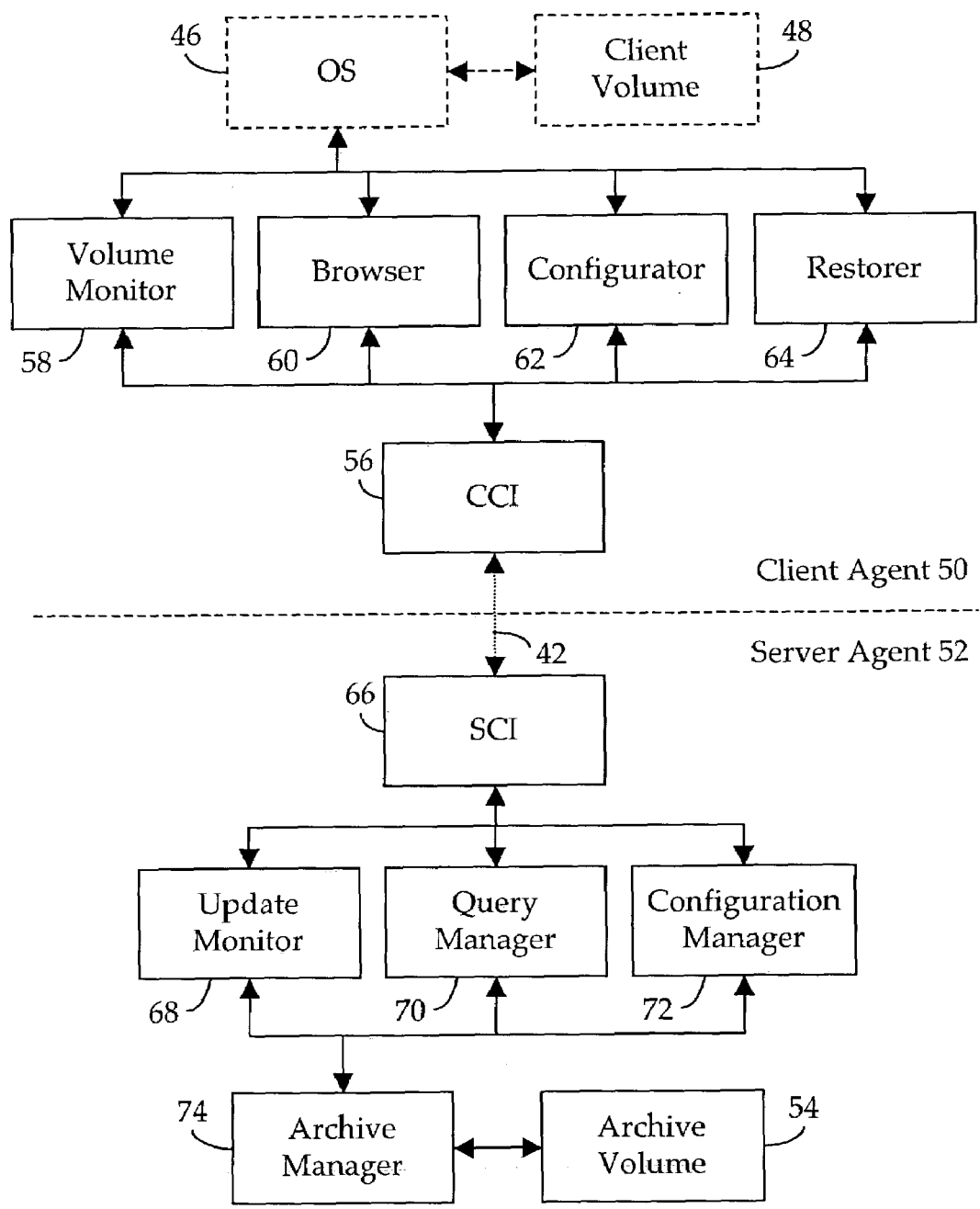
FIG. 4 is a diagrammatic representation of the client and server agents shown in FIG. 3.

Shown in FIG. 1 and FIG. 2 is a stand-alone system 2 comprising a conventional personal computer that we shall refer to as our Client 4, and a storage agent that we shall refer to simply as the SA 6, constructed in accordance with a stand-alone embodiment of our invention. By stand-alone we mean that at least the protected volume is contained within one enclosure 8, while at least the archive volume is contained within another enclosure 10 which is independent of, and separated from, enclosure 8.

As shown in greater detail in FIG. 2, Client 4 is comprised of a central processing unit, CPU 12, which is coupled directly to main memory 14, and a system controller 16 which is coupled to a hard disk, Client Disk 18 (containing the protected volume), an input device 20, such as a keyboard, an output device 22, such as a monitor, and a high-speed interface 24 which may implement any of the know high-speed communication protocols such as the Universal Serial Bus ("USB"), the IEEE 1394 ("Firewire") or one of the Ethernet options, including 10BaseT, 100BaseT or 1000BaseT. Preferably, as shown generally in FIG. 1, at least the CPU 12, the memory 14, the system controller 16, the Client Disk 18, and the interface 24 are contained with enclosure 8, and supplied with operating power by a power supply 26.

As also shown in detail in FIG. 2, SA 6 is comprised of a central processing unit, CPU 28, which is coupled directly to main memory 30, and a system controller 32 which is coupled to a hard disk, Archive Disk 34 (containing the archive volume), a simple output device 36, such as one or more light emitting diodes ("LEDs")or a small liquid crystal display ("LCD"), and a high-speed interface 38 which may implement any of the know high-speed communication protocols such as USB, Firewire or Ethernet. Preferably, all of the hardware components comprising the SA 6 are contained within enclosure 10, and supplied with operating power by a power supply 40. A suitable cable 42 (not shown in FIG. 1) connects the interface 38 of the SA 6 to the interface 24 of the Client 4 to enable high-speed communication between the SA 6 and the Client 4 during normal operation of the stand-alone system 2.

Figure 3:
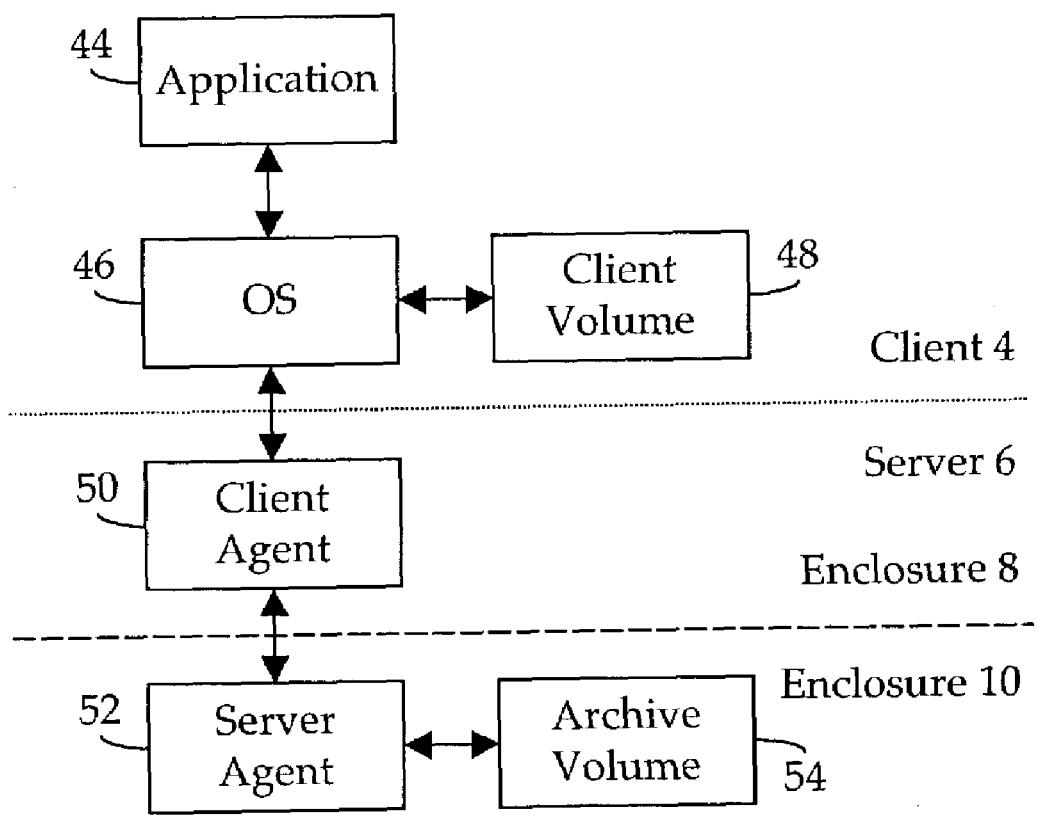
FIG. 3 is a high-level diagrammatic representation of the main software components of the system shown in FIG. 1.

Shown generally in FIG. 3 are the main software components of the stand-alone system 2. As is conventional in Client 4, an application 44, such as a word processing or spreadsheet program, executes under control of an operating system, OS 46, to create, modify or delete data files stored on a client volume 48. Within the context of the specific hardware configuration shown in FIG. 2, both the application 44 and the OS 46 will, during the execution thereof by the CPU 12, reside, at least in part, in the memory 14, and will make use of the system controller 16 on an as-required basis to interact with the user via the input device 20 and the output device 22, in order to implement requested actions relative to the client volume 48 resident on the Client Disk 18.

In accordance with a preferred embodiment of our invention, the main software components of our SA 6 consist of a Client Agent 50, adapted to reside within the Client 4 and to interact with the OS 46, a Server Agent 52, adapted to reside within the SA 6 and to interact with the Client Agent 50 to automatically maintain an archive of the contents of the client volume 48 in an archive volume 54, resident on the Archive Disk 34. In general, the archive will:

Faithfully represent all aspects of an NTFS 5.0 file system including file contents and supporting information including security, attributes, date, EFS, Windows compression, and sparse files.

Provide for simultaneous storage and access to multiple file revisions.

Provide strong integrity in the face of damage to the archive including safe recovery after system failure.

Together with other components provide resynchronization between the archive and the protected volume after system failure.

Provide a range of automatically selected compression options including:

No compression—where not helpful.

Generic file-level compression.

Multiple revision compression. E.g., cvs for text files.

File type-specific compressors for file-level and multiple revision compression.

In our preferred embodiment, the Client Agent 50 and the Server Agent 52 communicate using a Client Server Protocol ("CSP") which is designed to abstract out the details of the specific communication protocol implemented by the interface 24 and the interface 38. Preferably, CSP will utilize existing drivers, such as, for example, USB, 1394, and Ethernet. In addition, CSP implements checksums and encryption on each transfer to ensure the fidelity and privacy of the transaction.

The Client Agent

In our preferred embodiment, the Client Agent 50 includes: a Client Communication Interface, CCI 56; a Volume Monitor 58; a Browser 60; a Configurator 62; and a Restorer 64. The Client Agent 50 relies upon the basic hardware and software services provided by the OS 46. Individual components of the Client Agent 50 are multi-threaded as appropriate, allowing for maximum flexibility and performance. In our preferred embodiment, the Client Agent 50 will be distributed on compact disk ("CD") and be automatically installed in the Client 4 using a secure installation program, such as Install Shield. The user should be able to accept all the defaults and get a reasonable, and for 95% of the population, perfect configuration of the SA 6.

The CCI 56 is the conduit through which the Client Agent 50 communicates with the Server Agent 52 via the CSP.

The Volume Monitor 58 monitors volume changes, packaging and queuing the changes, and communicating those changes to the Server Agent 52. In particular, the Volume Monitor 58 keeps track of all volume activity of the Client 4 and distills this into a list of change orders. The Volume Monitor 58 communicates these change orders and associated data to the Server Agent 52 via the CSP. Specific activities of the Volume Monitor 58 include:

Monitor changes. Monitor changes on the volume such as file/directory addition, change, deletion, renames, and changes to attributes and security. There are a number of mechanisms for monitoring changes to a volume. The preferred method is to use the Change Journal functionality introduced with Microsoft's Windows 2000 together with the associated USN data stored in the MFT. This and other approaches are discussed later.

Filter out irrelevant changes to the volume. Various mechanisms for monitoring file changes produce a wealth of data which can be distilled into a smaller set. For example, the Change Journal will record each and every write to a file. For our purposes, we can wait until the file is closed and treat it as a single update. Similarly, a filter driver will capture every read of the file, which we may not care about at all.

Coalesce changes. Coalesce changes that occur within a defined time window into a smaller summary set. In an ideal world, each and every change would be captured in full as it happened, ordered identically to the changes on the volume. In this ideal model, we could roll back the volume to any point in time reliably and without adverse consequences. Such an ideal cannot be achieved firstly because changes in processor state beyond our control would also need to be reversed, and secondly and practically this would require an archive substantially larger than that being protected as well as a compute resource comparable to that on the Client 4.

At the other extreme, we find a traditional backup system. In this traditional model, from time to time a complete snapshot of the volume is created. Every item on the volume is archived in an order that is arbitrary and generally has no relationship to the order in which changes were made to this point. In addition, changes that take place during the backup may not be reflected at all or may be reflected unreliably in the archive. Multiple backups may be archived as space allows. Incrementals may be used to reduce the cost of archive media, but the semantics of the backup are unchanged.

Our goal is to provide a system as close to the ideal model as the constraints of compute and storage resources allow. Preferably, the Client Agent 50 will have a reasonable set of heuristics to control change capture. For example, if the user is editing a document and types CTRL S every two seconds, we might not want to capture the file after each and every save. Through a set of heuristics the system operates with an adaptive window during which it accumulates and coalesces volume changes, and at the end of which it captures those changes and communicates them to the Server Agent 52.

The heuristics should have reasonable defaults which adjust to changing system activity and can be overridden by a knowledgeable user. An example set of heuristics would be "filter and coalesce volume changes, issuing capture instructions on the earlier of 15 minutes elapsed wall clock time or 100 megabytes of accumulated data to transfer". Special handling for temporary, cache, system, large files, locked, or frequently changing files could also be incorporated into the heuristics.

Capture changes. The fact and the substance of each relevant change must be captured. This includes the description of what happened (e.g., file created) as well as the specifics (file name and location, attributes and security information, the names of and the data contained within all streams within the file). Specific user identifier ("uid") details, reparse information, and other intricate details must also be considered.

Communicate the changes. Once data is captured, it must be communicated to the Server Agent 52 in a timely manner. Ideally, data will be read directly from the volume and written into the communication channel to the Server Agent 52. In reality, due to the potentially huge disparity in data transfer rate between the volume being protected and the communication medium connecting Client Agent 50 to Server Agent 52, we may under some circumstances stage data to be archived somewhere on the specific volume being protected or preferably on a separate volume on the Client 4.

The advantage of staging data on the Client 4 is that we can provide archiving with better temporal fidelity. The disadvantage of staging is that it will use more compute, disk bandwidth, and disk space resources on the Client 4. Heuristics will control the determination of when to use staging.

Together with other components, provide a reliable resynchronization for the archive across system crashes and other unanticipated events.

The Browser 60 is a graphical user interface or GUI application for browsing the archive. Preferably, the functionality of an existing browser, such as Microsoft's Windows Explorer is enhanced so that a new item called "Archived Versions" appears on the Right Click menu for any file or directory; selecting this item will thereby provide a list of available versions—select one and you get a choice of Open (copied from the archive to the temporary directory and then opened), Restore (popup to choose original or alternate location), Properties, and Cancel. Alternatively, a GUI application that we call the Archive Browser is provided which is similar to the Windows Explorer, but with an additional box that lets you set a date and time; in response to clicking in this new box, the archive's representation of the archive volume 54 at that time will be shown.

The Configurator 62 is another GUI application for configuring the Client Agent 50 and the Server Agent 52. Preferably, it can be accessed via an Icon on the Control Panel, a link on the Start Menu tree, and via the Notification Icon. When you start it you get the traditional box with several tabs. The tab you start on is called "Wizard" and is essentially a Wizard that will walk you through the steps. Behind the Wizard are another set of tabs that allow direct settings. Using either approach, the following functionality is desirable:

Turn archiving off and on (pause and restart).

Create and delete archives (with appropriate confirmations).

Adjust file system selection criteria:
- List volumes to archive. (Default is drive C:).
- What to archive:
  - All files (Default).
  - All user files (e.g., Documents and Settings).
  - All files except cache files.
  - User defined list of trees.
- What not to archive. A list of wildcard expressions to exclude specific subtrees, file types, etc. (Default list will include things like C:\WINDOWS\memory.dmp.)

Set user as which to run (supply user name and password). Maybe just default to Administrator or SYSTEM. The need for this depends upon the method used for accessing the volume.

Set heuristics including those for coalescing and staging changes such as:

Time (e.g., flush every 15 minutes).
File or change count (e.g., 100 change entries).
Size (e.g., 10 MB of data).
Choose whether the Notification Icon is visible. Default behavior is to appear with an information balloon when attention is required (hopefully never), otherwise remain unseen. If displayed, the balloon tells the user something simple and informative, like archive state is "Healthy", "Initial Synchronization Running, % x Complete", "y files queued for update", etc. Additional messages might include: "Disk Near Full", "Full Alert", "Backup Failed Alert". For more urgent communications, the user may enable immediate visual notification via the output device 36. For example, a Right click might invoke a popup menu with the following options:
Enable/Disable—pause/resume the SA 6.
Sync—force a synchronization right now, i.e., push all pending traffic from the Client Agent 50 to the Server Agent 52.
Change Settings—brings up the Control Panel plug-in.

The Restorer 64 is a GUI application for restoring data from the archive, preferably integrated with Browser 60. Alternatively, it can be a Wizard that provides a more traditional interface.

The Server Agent

In our preferred embodiment, the Server Agent 52 includes: a Server Communication Interface, SCI 66, to the Client Agent 50; an Update Monitor 68, for receiving volume changes from the Client Agent 50 and queuing them for archival; a Query Manager 70, for managing request from the Client Agent 50 for information retrieval from the archive; a Configuration Manager 72, for fielding requests from the Client Agent 50 for bookkeeping operations including downloading software updates and configuring the SA 6; and an Archive Manager 74, responsible for archive integrity, compression, decompression, and revision control, including insertion, deletion, retrieval, and query operations. The Server Agent 52 relies upon the basic hardware and software services provided by the server operating system. Individual components of the Server Agent 52 are multi-threaded as appropriate, allowing for maximum flexibility and performance. In our preferred embodiment, the initial version of the Server Agent 52 will be installed in the SA 6 at the time of manufacturing. In our preferred embodiment, however, newer versions of the Server Agent 52 will be distributed either electronically, via the Internet, or on CD, together with a secure installation program, such as Install Shield.

The SCI 66 is the conduit through which the Server Agent 52 communicates with the Client Agent 50 via the CSP.

The Update Monitor 68 is the counterpart in the Server Agent 52 to the Volume Monitor 58 in the Client Agent 50. The Update Monitor 68 listens via CSP for changes from the Volume Monitor 58. The Update Monitor 68 accepts these changes, and queues or stages them on the Archive Disk 34. After the changes are staged, the Update Monitor 68 notifies the Archive Manager 74 of their arrival. Later, after they have been processed, the Archive Manager 74 deletes them. Preferably, the Update Monitor 68 cooperates with other components, to provide a reliable resynchronization for the archive across system crashes and other unanticipated events.

The Query Manager 70 fields requests from the Client Agent 50 for information retrieval from the archive. In essence, it provides an interface that allows the Client Agent 50 to perceive the archive as a normal volume for purposes of exploration and restoration. Preferably, the Query Manager 70 presents an application programming interface ("API") to the Client Agent 50 that mimics, for example, a subset of the standard Windows Volume, Directory, and File Management functions with certain added capabilities to reflect the temporal capabilities of the archive and more efficient transfer capabilities for volume restoration.

The Configuration Manager 72 fields requests from the Client Agent 50 related to bookkeeping tasks such as accepting configuration commands, archive integrity checks, and new downloads of Server Agent and Server Platform Software.

The Archive Manager 74 is responsible for all aspects of archival including archive integrity, formatting, compression, decompression, and revision control. The Archive Manager 74 has an interface allowing for all insertion, deletion, retrieval, query operations, and bookkeeping operations. Preferably, the Archive Manager 74 implements the following functions:

Listen for and process changes sent by the Update Monitor 68.
Listen for and process requests from the Query Manager 70.
Maintain a physical store representing the archive (integrity, etc.)
Manage compression, decompression, and revision control of data.
Together with other components, provide a reliable resynchronization for the archive across system crashes and other unanticipated events.

Essential Processes

In our preferred embodiment, the Client Agent 50 cooperates with the Server Agent 52 to accomplish the following essential purposes:

Initial file system synchronization. Initially we have an empty archive. To create the initial archive, we perform a brute force enumeration of the client volume 48 and create an exact replica in the archive volume 54. Note that this can be performed while the system is in normal operation. While this process is taking place, our normal file system synchronization is also active, but the Archive Manager 74 will ignore changes logged by the Volume Monitor 58 that are within subtrees of the client volume 48 which the initial synchronization has not yet captured. After this one-time process is complete, the archive in the archive volume 54 will be a faithful reproduction of the client volume 48.

One primary goal of our invention is to properly archive each file system object with 100% accuracy. Accordingly, we need to preserve the data, attributes, ownership, and security information associated with each file system object. In general, at an application level, there appear to be two strategies, in a Windows environment, for copying an entire NTFS file object with high fidelity. One uses the Backup{Read,Write,Seek} functionality to identify and read each constituent of an object. The other uses Backup{Read, Seek} just to identify the constituents, and then uses other functions such as CreateFile (on streams), {Get,Set}[Named]SecurityInfo, and {Get,Set}FileSecurity to copy and preserve all constituent data. Additionally, we will copy all security descriptor information both in binary form (for easy restore) as well as in textual form. This latter form is to facilitate creating a meaningful mapping from archived descriptors to the descriptors on a new/reinstalled computer during a restore. For example, ConvertSecurityDescriptor- ToStringSecurityDescriptor, ConvertSidToStringSid, and related functions provide the needed functionality.

The initial synchronization of the archive volume 54 with the client volume 48 is rather a complex task. We need to catalog all objects on the volume. For a static volume this is trivial. However, we have to assume that the volume will be changing even as we make our archive. The basic idea is to capture the current Change Journal pointer, catalog the volume, and then incorporate all changes that occurred during that cataloging process. Once we've got the catalog, we just monitor the Change Journal to keep up to date. Initial synchronization performs the following sequence of tasks:

Initialize the database.

Catalogue the volume. If change(s) we cannot handle occurred during the catalog, repeat this step (potentially indefinitely).

Queue all file system objects for initial archiving.

Start normal monitoring.

By way of example, these functions can be realized using code similar in operation to the following pseudo-code fragments:

```
void VolumeSetState( Volume v, VolumeState vs )
{
    // Tell the USA to mark the state for the given volume and take
    // necessary bookkeeping actions.
    " system specific implementation code here"
}
void DatabaseInitialize ( )
{
    // Initialize the database structure to an empty form.
    " system specific implementation code here"
}
BOOLEAN DatabaseHasEntry( FRN self )
{
    // Is there any entry for this FRN?
    " system specific implementation code here"
}
void DatabaseAdd(
        FRN self,
        FRN parent,
        LPWSTR *name,
        USN *usn,
        int state
    )
{
    // Add an filesystem object to the database.
    ASSERT( FALSE = = DatabaseHasEntry( self ));
    " system specific implementation code here"
}
void DatabaseReplace(
        FRN self,
        FRN parent,
        LPWSTR *name,
        USN *usn,
        int state
    )
{
    // Replace an filesystem object in the database.
    ASSERT( TRUE = = DatabaseHasEntry( self ));
    " system specific implementation code here"
}
void DatabaseRemove(
        FRN self,
        FRN parent,
        LPWSTR *name,
        USN *usn,
        int state
    )
{
    // Remove a filesystem object in the database.
    ASSERT( TRUE = = DatabaseHasEntry( self ));
    " system specific implementation code here"
}
```

-continued

```
void DatabaseQueueArchive( DATABASE_ENTRY *entry, int archive_
request )
{
    // Queue a request to archive this object.
    " system specific implementation code here"
}
USN ChangeJournalGetNextUSN( )
{
    // Return the next USN that will be written in the change
    // journal.
    " system specific implementation code here"
}
USN USA_next_usn = 0;
void VolumeSetNextUSNToCheck( USN usn )
{
    // Remember this as the next usn record we will care about.
    USA_next_usn = usn;
}
USN VolumeGetNextUSNToCheck( )
{
    // Return the next usn record we will care about.
    return USA_next_usn;
}
void VolumeInitialSync( Volume v )
{
    VolumeSetState( v, VOLUME_STATE_INITIALIZING );
    // Create an initial index of the volume, don't worry about
    // specifics, just the contents and structure as represented by
    // the node names, FRNs, and parent FRNs.
    for (;;) {
        // Erase the database.
        DatabaseInitialize( );
        // Bookmark the change journal before we start.
        USN start_usn = ChangeJournalGetNextUSN( );
        // Add each member of the MFT to the database.
        FOREACH_ENTRY_IN_MFT( entry, MFT( v )) {
            DatabaseAdd(
                entry.frn,
                entry.parent_frn,
                entry.name,
                entry,
                NOT_ARCHIVED
            );
        }
        USN finish_usn = ChangeJournalGetNextUSN( );
        FOREACH_USN_IN_RANGE( usn, start_usn, finish_usn ) {
            // Arguably we can handle any changes that occurred
            // while reading the MFT, but for now just punt.
            goto repeat_the_loop;
            // If we see a create action, just add the entry,
            // overwriting any predecessor.
            if (usn.type = = CREATE) {
                if (DatabaseHasEntry( usn.frn ))
                    DatabaseReplace(
                        usn.frn,
                        usn.parent_frn,
                        usn.name,
                        usn,
                        NOT_ARCHIVED
                    );
                else
                    DatabaseAdd(
                        usn.frn,
                        usn.parent_frn,
                        usn.name,
                        usn,
                        NOT_ARCHIVED
                    );
            }
            // If we see a delete action, just delete the entry
            // if it's there.
            else if (usn.type = = DELETE) {
                if (DatabaseHasEntry( usn.frn ))
                    DatabaseRemove( usn.frn );
            }
            // If we see a rename, replace whatever is there or
            // else create a new entry.
            else if (usn.type = = RENAME) {
                if (DatabaseHasEntry( usn.frn ))
```

-continued

```
        DatabaseReplace(
            usn.frn,
            usn.parent_frn,
            usn.name,
            usn,
            NOT_ARCHIVED
        );
    else
        DatabaseAdd(
            usn.frn,
            usn.parent_frn,
            usn.name,
            usn,
            NOT_ARCHIVED
        );
    }
    // Nothing else matters at this point in time.
    else
        // Ignore change.
    }
    VolumeSetNextUSNToCheck( finish_usn );
    VolumeSetState( v, VOLUME_STATE_INITIALIZED );
    break;
repeat_the_loop:
    ;
    }
}
// Now we know everything that's on the volume and we can use the
// change journal to track all future changes.
// Queue a request to archive each and every object on the
// volume.
FOREACH_ENTRY_IN_DATABASE( entry ) {
    DatabaseQueueArchive( entry, INITIAL_WRITE );
}
// Now we start the normal monitoring process.
}
```

Normal file system synchronization. This is the essential everyday task performed by the stand-alone system 2. As the user works on the Client 4, the SA 6 watches, updating the archive with changes made to the protected volumes. In general, there are a number of mechanisms for detecting volume changes. For example, if the OS 46 is either Windows 2000 or Windows XP, the following methods are possible:

Archived Attribute Bit: This is the classic backup method. Each file has a set of attributes, each reflected in a respective Attribute Bit. One such Attribute Bit is the Archived Bit. When a full backup (i.e., a backup of the entire file system) is performed, all files are copied from the file system to the archive. As each file is copied, the backup program sets the Archived Bit associated with each file to true. During normal system operation, whenever a file is created or modified, its Archived Bit is set to false. This allows the backup system to detect which files have changed since the last backup and perform an incremental backup of just those changed files with the Archived Bit set to false. Within our context, this serves the similar purpose of flagging those files which need to be updated in the archive. Using this technique, the SA 6 would scan the entire file system from time to time, identifying files that need to be updated in the archive. As each file is updated, the Archived Bit would be set to true.
  Positives: Requires only straightforward user code. Requires no Windows drivers. Works for all NTFS file systems and FAT32. Works for all variants of XP Home, XP Professional, and Windows 2000 Professional.
  Negatives: Requires a brute force scan of the file system each time we wish to update the archive which can be timely and consume significant host resources.

Brute force comparison: This is effectively the same as the prior approach. It differs in that we do not use the archived Attribute Bit. Instead, we compare the contents of the client volume 48 to the archive to identify changes. Typical comparison criteria include file modified date and file size.
  Positives: Same as with the Archived Bit plus we can now have multiple backup sets that cover the same file system properly since in essence, each backup set maintains its own virtual Archived Bit.
  Negatives: Same as with the Archived Bit plus our brute force search is now slightly more costly due to the need to examine multiple file characteristics and compare against the archive. Potential to miss files if a file changes but has the same size and date; a painful workaround is to compare all such files, which is quite painful, since this should be most files.

Disk Filter Driver: It is possible to create what is called a WDM (Windows Driver Model) Disk Filter Driver. Effectively, this driver accepts requests from applications and passes them on to the real disk driver. Think of it as tapping a phone line. As we watch the traffic flow, we can note all files which are created, written, renamed, or have their security settings changed. This change log then drives the SA 6. This is how many antivirus packages work.
  Positives: No reliance on the Archived Bit, so multiple backup sets are possible and there is no fear of unintended interactions with other backup applications. Constant and complete real-time surveillance so we will have timely and accurate notification of all changes. WDM will work for all variants of Windows 2000 Professional and Windows XP Home and Professional. No need for brute force searches since we have a log of all activity from system boot to shutdown.
  Negatives: Requires kernel model driver. Needs a way to write the pending change log to the Client Disk 18 at system shutdown to avoid losing any changes that may still be pending at system shutdown.

Change Notification: Windows provides a Change Notification API whereby a thread executing on the Client 4 can ask to be informed of changes on the system. Specifically, our thread can subscribe to all changes on tracked file systems including creating, renaming, and deleted files and directories, writing files, and changes to security attributes.
  Positives: Requires only straightforward user code. Requires no Windows drivers. Works for all NTFS file systems and probably FAT32 (need to check). All the positives of the filter driver approach except that we won't have track of changes at boot before our thread activates or at shutdown after our thread is stopped.
  Negatives: Because we don't have full coverage at boot and shutdown, we will need to run a complete file system scan from time to time, most properly immediately after each boot to capture the changes that took place while our change notification thread was stopped.

Change Journal: Windows 2000 introduced a Change Journal API whereby the file system itself writes a journal of all changes. A thread can either constantly monitor this journal or check it from time to time.
  Positives: Requires only straightforward user code. Requires no Windows drivers. All the positives of the filter driver approach.
  Negatives: Only works with Windows 2000 and Windows XP and NTFS 5.0 or greater.

Normal file system resynchronization. Whenever the Client 4 boots, the Archive Manager 74 must resynchronize the archive volume 54 to the client volume 48. By way of example, the essential resynchronization functions can be realized using code similar in operation to the following pseudo-code fragments:

```
void VolumeResync( Volume v )
{
    // This shouldn't happen unless the USA is busted or was moved from
    // one computer to another.
    if ("ServerAgent does not have valid Change Journal") {
        VolumeInitialSync( v ); // Force complete copy of volume.
        return;
    }
    // Delete any partially archived file
    if (last entry in Change Journal is "Open") {
        "purge any record written in Archive Manager queue"
        "write matching Cancel entry in Change Journal"
    }
    // USN on the Client has lost entries we need
    if ("USN of last Server Change Journal entry is not available on
    Client") {
        VolumeInitialSync( v ); // Force complete copy of volume.
        Return;
    }
    "Set next USN for Volume Monitor to be that following the USN in
    last Server Change Journal entry"
    // Now we can proceed with normal file synchronization.
}
```

Extraordinary file system resynchronization. From time to time something unfortunate happens. Generally, this is a system crash although other, even less benign events can also take place. In general, there are two potential failure modes:

System crash. The most typical situation is a simple system crash. Upon a normal shutdown, both the host and the device will write status completion state in memory. Upon reboot without appropriate data in place, the USA will seek to resync with the file system. This could be as simple as comparing the Change Journals on the host and the USA disk, or as painful as checksuming and comparing the file system against the archive.

In general, synchronization between the Client 4 and the SA 6 is established as follows. Each time the Volume Monitor ships a changed file record to the Update Monitor, it includes the USN associated with that change. The Update Monitor writes the header from the record (containing the basics about the file and its USN) into the Server Agent's Change Journal as an "Open" record. Next, it stages the complete record into the Archive Manager's queuing area. Finally, it writes a matching "Close" record into the Server Agent's Change Journal. The Server uses precise in order file system access, so the order of "Open" into Change Journal, stage record for Archive Manager, and "Close" into Change Journal will always be obeyed.

Significant disk failure. If the client volume 48 and the archive volume 54 seem to be substantially out of sync, the SA 6 will enter a mode where it does not delete any old revisions in the archive, and issues a pop up notice to the user letting them know what's happened.

Graceful Degradation

In accordance with the preferred embodiment of our invention, we provide a method and apparatus for automatically archiving, in essentially real-time, the contents of the on-line file systems of a digital data processor while, at the same time, controlling the size of the archive by selectively discarding older versions of current files. We call our method graceful degradation or simply "GD". GD is a new approach to archival storage. In general, GD provides the accuracy of continuous storage with far greater storage efficiency. As with continuous storage, the file system remains available 100% of the time during the archival process. GD's storage efficiency is the result of an innovative approach to archival management.

In a typical backup system, all backups are kept until they reach a designated age at which point they are discarded. The real world equivalent is the requirement to keep your financial records intact until some point in time, after which they can be (perhaps!) safely discarded. If you keep your records twice as long, you're probably going to need about twice as much space to store them. In this approach, space grows linearly with the length of time covered by the archive. The objective of GD is to allow you to keep your records with only logarithmic growth in required space as the length of time covered by the archive increases.

GD works by initially recording file system changes in the same manner as continuous archival. It differs in its treatment of the management of archival objects as they age. Assume we wish to keep all files for four weeks. In a typical archival system all changes would be kept for four weeks after they are recorded and then be discarded. GD works by filtering the archive. Recently recorded changes are all left intact. We might choose to keep just half of the changes that are in the archive more than a few hours. Those that were recorded more than a week ago we might choose to keep even fewer. In this manner we can drastically reduce the amount of storage used in the archive, while at the same time keeping a very precise record of recent changes, which a user is most likely to need.

Another possible implementation of GD is to establish age intervals and allow just a limited number of copies of an object within each interval. For example, imagine we wish to make available to the user every copy (revision) of a frequently edited file within the past 15 minutes, and one copy during the next 15 minutes, then once per hour out to 24 hours, then once per day out to 7 days, then once per week out to four weeks. GD allows us to do this, providing the full benefit of continuous backup when it is really useful—when working with the most recently accessed file system objects—while also providing efficient use of storage by retaining fewer and fewer revisions of file system objects as they age.

In effect GD is a filter applied to the set of revisions of each file system object stored on the archive media. A GD filter can be applied each time a new object revision is added to the archive, or it can be applied lazily, either when the backup system is idle or when available storage drops below a safe level and we need to throw out some old revisions we no longer need.

Sample GD Algorithm

We describe a sample GD algorithm which divides time into a sequence of age intervals. When the GD algorithm is applied, we keep just the oldest revision of each object present in each age interval. Special consideration is given to ensure we also keep the most recent revision. Special consideration is also given to ensure we keep at least one revision of the object, regardless of how old it becomes; we need to do this since some objects never change, so our initial snapshot of an object may be the only one we ever make and we'll need it to properly restore this object should the need arise.

A sequence of n age intervals is represented by an array A, with n+1 elements indexed from $A_0$ to $A_n$. Each element in A specifies a time delta relative to the time at which the filter is applied, typically the current time. By definition $A_0$ contains any value less than zero and $A_1$ contains the value 0. By definition $A_i < A_{i+1}$ for all i from 0 to n−1. We refer to the array A as a GD filter. For example, consider the filter:

A=[−1t, 0t, 1t, 2t, 4t, 6t, 10t], n=6

In this discussion t is our unit of time, which could be any relevant measure. (E.g., minutes.)

We determine in which age interval each object revision belongs as follows. Given a current time now(t), age interval i includes all those object revisions with timestamps TS such that:

(now(t)−$A_i$)>TS>=(now(t)−$A_{i+1}$)

Assume now(t)=37t. Given the above filter we have six age intervals which cover the following time intervals:

| Age Interval |
|---|
| (37-(−1))t > TS >= (37-0)t |
| (37-0)t > TS >= (37-1)t |
| (37-1)t > TS >= (37-2)t |
| (37-2)t > TS >= (37-4)t |
| (37-4)t > TS >= (37-6)t |
| (37-6)t > TS >= (37-10)t |

Graceful degradation works by applying the time filter to the revision set of an object. The revision set of the object tags each revision with a timestamp which we use for the GD filter.

Consider an object with revisions with the timestamps as shown:

set R={37t, 34t, 33t, 31t, 30t, 29t, 25t, 22t, 15t, 7t}, m=|R|=10

Assume the current time is 37t and as shown we just wrote a new revision of our file system object at 37t. At time 37t our intervals using the above filter and the timestamps of the revisions that map to them would be:

| Age Interval | Revisions |
|---|---|
| (37-(−1))t > TS >= (37-0)t | 37t |
| (37-0)t > TS >= (37-1)t | |
| (37-1)t > TS >= (37-2)t | |
| (37-2)t > TS >= (37-4)t | 34t, 33t |
| (37-4)t > TS >= (37-6)t | 31t |
| (37-6)t > TS >= (37-10)t | 30t, 29t |

Note that the revisions with timestamps 25t, 22t, 15t, and 7t have aged beyond our level of interest and do not map to any age interval.

The result of running the filter GD(now(t), A, n, R, m) is:

NEWR:={37t, 33t, 31t, 29t}, newm:=|NEWR|

Earlier, we mentioned that we pay special attention to ensure we always keep the most recent revision of an object. We also said we need to ensure that at least a single revision of each object is present at all time. We accomplish both tasks by modifying our GD filter with the additional step:

NEWR:=union(NEWR, max(R))

The GD filter can be precisely described as such:

```
Set GD(
    Timestamp now,        // the time relative to which the filter is to be
                          applied
    Array A[0 . . . n],   // array containing coefficients for n age intervals
    Integer n,            // count of age intervals
    Set R{ },             // set of timestamps for revisions to be filtered
    Integer m             // number of timestamps in R
)
{
    Set NEWR := { };
    FOR EACH INTEGER i FROM 0 TO n-1 INCLUSIVE {
        Set TMP := { };
        FOR EACH MEMBER e in SET R {
            If (e >= (now − A[i+1]) AND e < (now − A[i]))
                TMP := union( TMP, e );
        }
        If (TMP != { })
            NEWR := union( NEWR, min( TMP ));
    }
    NEWR := union( NEWR, max( R ));
    Return NEWR;
}
```

This is but one possible algorithm. Note that the choice of which revision to keep in each interval is critical. A selection method that is guaranteed to fail in certain pathological cases is to always keep the youngest element in each interval. It is easy to construct cases whereby objects don't age at all whenever more than a single revision can map to a single interval. Consider the filter [−1t, 0t, 1t, 3t, 5t, 7t] with an input of new revisions generated once per t unit of time. Each time the GD filter is applied to the interval 1t>R>=3t the oldest element is pruned, preventing any revision from advancing to the next interval.

One simple enhancement is to allow keeping more than a single revision in each age interval by associating an interval capacity with each interval. There are a variety of approaches to selecting which elements to keep. One good algorithm is to allow just a single element in each age interval except for the first few intervals which can each contain an unlimited number of revisions. This allows archival of unlimited edits until they age to a certain point, after which the age interval system precisely controls the amount of storage required.

Age intervals in filters can be any size, with the size defined by our goals. In the framework given above, we can model a typical backup sequence that keeps a new snapshot once per day and then recycles the snapshot media after two weeks as [−1t, 0t, 1t, 2t, . . . , 14t] where the value of t in this case is one day. To model a backup where we keep a single snapshot per hour out to 24 hours and then one per day out to 1 week, we would use [−1t, 0t, 1t, 2t, . . . , 24t, 48t, 72t, . . . 168t] where in this case t represents a single hour.

While intervals can be any size, in order to meet our objective, the sizes of the intervals should grow as we move to higher array indices (i.e., further in the past).

EXAMPLE 1

Linear Filter

Here is an example of a linear filter, similar to typical backups showing the status of the archive over time. We assume a filter:

A[−1t, 0t, 1t, 2t, 3t, 4t, 5t, 6t, 7t, 8t, 9t, 10t, 11t, 12t, 13t, 14t]

Here is the content of the archive over time with the object changes at times t0, t1, . . . t20 and the filter applied after the insertion of each new revision:

```
Filter is -1 0 1 2 3 4 5 6 7 8 9 10 11 12 13 14
Adding   0, archive becomes:   0
Adding   1, archive becomes:   1   0
Adding   2, archive becomes:   2   1   0
Adding   3, archive becomes:   3   2   1   0
Adding   4, archive becomes:   4   3   2   1   0
Adding   5, archive becomes:   5   4   3   2   1   0
Adding   6, archive becomes:   6   5   4   3   2   1   0
Adding   7, archive becomes:   7   6   5   4   3   2   1   0
Adding   8, archive becomes:   8   7   6   5   4   3   2   1   0
Adding   9, archive becomes:   9   8   7   6   5   4   3   2   1   0
Adding  10, archive becomes:  10   9   8   7   6   5   4   3   2   1   0
Adding  11, archive becomes:  11  10   9   8   7   6   5   4   3   2   1   0
Adding  12, archive becomes:  12  11  10   9   8   7   6   5   4   3   2   1   0
Adding  13, archive becomes:  13  12  11  10   9   8   7   6   5   4   3   2   1   0
Adding  14, archive becomes:  14  13  12  11  10   9   8   7   6   5   4   3   2   1   0
Adding  15, archive becomes:  15  14  13  12  11  10   9   8   7   6   5   4   3   2   1
Adding  16, archive becomes:  16  15  14  13  12  11  10   9   8   7   6   5   4   3   2
Adding  17, archive becomes:  17  16  15  14  13  12  11  10   9   8   7   6   5   4   3
Adding  18, archive becomes:  18  17  16  15  14  13  12  11  10   9   8   7   6   5   4
Adding  19, archive becomes:  19  18  17  16  15  14  13  12  11  10   9   8   7   6   5
Adding  20, archive becomes:  20  19  18  17  16  15  14  13  12  11  10   9   8   7   6
```

Note that the size of the archive grows linearly with time. Captured revisions are available at equally spaced intervals.

EXAMPLE 2

Linear Filter with Infrequent Changes

Now, here's the same filter applied to object changes at times t0, t3, t6, . . . t18, t21:

```
Filter is -1 0 1 2 3 4 5 6 7 8 9 10 11 12 13 14
Adding   0, archive becomes:   0
Adding   3, archive becomes:   3   0
Adding   6, archive becomes:   6   3   0
Adding   9, archive becomes:   9   6   3   0
Adding  12, archive becomes:  12   9   6   3   0
Adding  15, archive becomes:  15  12   9   6   3
Adding  18, archive becomes:  18  15  12   9   6
Adding  21, archive becomes:  21  18  15  12   9
```

Again, notice that we capture revisions at equally spaced points in time.

EXAMPLE 3

Linear Filter with Frequent Changes

Now let's try a linear filter where the changes come at intervals smaller than our age intervals. Let's use the filter:
A[−1t, 0t, 2t, 4t, 6t, 8t, 10t, 12t, 14t, 16t, 18t, 20t, 22t, 24t, 26t, 28t]

and apply it to a sequence of object changes at times t0, t1, t2, . . . t20.

```
Filter is -1 0 2 4 6 8 10 12 14 16 18 20 22 24 26 28
Adding   0, archive becomes:   0
Adding   1, archive becomes:   1   0
Adding   2, archive becomes:   2   0
Adding   3, archive becomes:   3   2   0
Adding   4, archive becomes:   4   2   0
Adding   5, archive becomes:   5   4   2   0
Adding   6, archive becomes:   6   4   2   0
Adding   7, archive becomes:   7   6   4   2   0
Adding   8, archive becomes:   8   6   4   2   0
Adding   9, archive becomes:   9   8   6   4   2   0
Adding  10, archive becomes:  10   8   6   4   2   0
Adding  11, archive becomes:  11  10   8   6   4   2   0
Adding  12, archive becomes:  12  10   8   6   4   2   0
Adding  13, archive becomes:  13  12  10   8   6   4   2   0
Adding  14, archive becomes:  14  12  10   8   6   4   2   0
Adding  15, archive becomes:  15  14  12  10   8   6   4   2   0
Adding  16, archive becomes:  16  14  12  10   8   6   4   2   0
Adding  17, archive becomes:  17  16  14  12  10   8   6   4   2   0
Adding  18, archive becomes:  18  16  14  12  10   8   6   4   2   0
Adding  19, archive becomes:  19  18  16  14  12  10   8   6   4   2   0
Adding  20, archive becomes:  20  18  16  14  12  10   8   6   4   2   0
```

Again, note the even spacing of captured revisions. Also note the constant presence of the most recently recorded revision.

EXAMPLE 4

Crafted Filter

While it's nice to know that we can emulate the normal behavior of traditional linear backups, our interest is in saving space. Consider a filter that keeps one backup per hour out to 4 hours, then one every four hours out to 16 hours, and then one daily out to 7 days. Where t is one hour, we can represent this as follows:

A=[−1t, 0t, 1t, 2t, 3t, 4t, 8t, 12t, 16t, 24t, 48t, 72t, 96t, 120t, 144t, 168t]

When applied to a sequence of changes at t0, t1, t2, . . . t170 we get:

Note again the constant presence of the most recently added revision, but note also that the frequency of revisions matches our filter.

As with linear filters, GD exhibits good behavior with hand crafted filters regardless of the frequency of occurrence or timing of updates.

EXAMPLE 5

Lazy Filtering

To this point, we've applied the filter after the insertion of each new revision. Because applying a filter is computationally expensive, it may be advantageous to filter a revision set only occasionally, either when storage space is low, or when the system is otherwise idle. Here is the prior example, but with the GD filter applied only after every 10 revisions are added, rather than at each insertion. The results:

Filter is −1 0 1 2 3 4 8 12 16 24 48 72 96 120 144 168

| Adding | | −1 | 0 | 1 | 2 | 3 | 4 | 8 | 12 | 16 | 24 | 48 | 72 | 96 | 120 | 144 | 168 |
|---|---|---|---|---|---|---|---|---|---|---|---|---|---|---|---|---|---|
| Adding | 0, archive becomes: | 0 | | | | | | | | | | | | | | | |
| Adding | 1, archive becomes: | 1 | 0 | | | | | | | | | | | | | | |
| Adding | 2, archive becomes: | 2 | 1 | 0 | | | | | | | | | | | | | |
| Adding | 3, archive becomes: | 3 | 2 | 1 | 0 | | | | | | | | | | | | |
| Adding | 4, archive becomes: | 4 | 3 | 2 | 1 | 0 | | | | | | | | | | | |
| Adding | 5, archive becomes: | 5 | 4 | 3 | 2 | 1 | 0 | | | | | | | | | | |
| Adding | 6, archive becomes: | 6 | 5 | 4 | 3 | 2 | 0 | | | | | | | | | | |
| Adding | 7, archive becomes: | 7 | 6 | 5 | 4 | 3 | 0 | | | | | | | | | | |
| Adding | 8, archive becomes: | 8 | 7 | 6 | 5 | 4 | 0 | | | | | | | | | | |
| Adding | 9, archive becomes: | 9 | 8 | 7 | 6 | 5 | 4 | 0 | | | | | | | | | |
| Adding | 10, archive becomes: | 10 | 9 | 8 | 7 | 6 | 4 | 0 | | | | | | | | | |
| Adding | 11, archive becomes: | 11 | 10 | 9 | 8 | 7 | 4 | 0 | | | | | | | | | |
| Adding | 12, archive becomes: | 12 | 11 | 10 | 9 | 8 | 4 | 0 | | | | | | | | | |
| Adding | 13, archive becomes: | 13 | 12 | 11 | 10 | 9 | 8 | 4 | 0 | | | | | | | | |
| Adding | 14, archive becomes: | 14 | 13 | 12 | 11 | 10 | 8 | 4 | 0 | | | | | | | | |
| Adding | 15, archive becomes: | 15 | 14 | 13 | 12 | 11 | 8 | 4 | 0 | | | | | | | | |
| Adding | 16, archive becomes: | 16 | 15 | 14 | 13 | 12 | 8 | 4 | 0 | | | | | | | | |
| Adding | 17, archive becomes: | 17 | 16 | 15 | 14 | 13 | 12 | 8 | 4 | 0 | | | | | | | |
| Adding | 18, archive becomes: | 18 | 17 | 16 | 15 | 14 | 12 | 8 | 4 | 0 | | | | | | | |
| . . . | | | | | | | | | | | | | | | | | |
| Adding | 24, archive becomes: | 24 | 23 | 22 | 21 | 20 | 16 | 12 | 8 | 0 | | | | | | | |
| Adding | 25, archive becomes: | 25 | 24 | 23 | 22 | 21 | 20 | 16 | 12 | 8 | 0 | | | | | | |
| Adding | 26, archive becomes: | 26 | 25 | 24 | 23 | 22 | 20 | 16 | 12 | 8 | 0 | | | | | | |
| . . . | | | | | | | | | | | | | | | | | |
| Adding | 32, archive becomes: | 32 | 31 | 30 | 29 | 28 | 24 | 20 | 16 | 8 | 0 | | | | | | |
| Adding | 33, archive becomes: | 33 | 32 | 31 | 30 | 29 | 28 | 24 | 20 | 16 | 0 | | | | | | |
| Adding | 34, archive becomes: | 34 | 33 | 32 | 31 | 30 | 28 | 24 | 20 | 16 | 0 | | | | | | |
| . . . | | | | | | | | | | | | | | | | | |
| Adding | 40, archive becomes: | 40 | 39 | 38 | 37 | 36 | 32 | 28 | 24 | 16 | 0 | | | | | | |
| Adding | 41, archive becomes: | 41 | 40 | 39 | 38 | 37 | 36 | 32 | 28 | 24 | 0 | | | | | | |
| Adding | 42, archive becomes: | 42 | 41 | 40 | 39 | 38 | 36 | 32 | 28 | 24 | 0 | | | | | | |
| . . . | | | | | | | | | | | | | | | | | |
| Adding | 48, archive becomes: | 48 | 47 | 46 | 45 | 44 | 40 | 36 | 32 | 24 | 0 | | | | | | |
| Adding | 49, archive becomes: | 49 | 48 | 47 | 46 | 45 | 44 | 40 | 36 | 32 | 24 | 0 | | | | | |
| Adding | 50, archive becomes: | 50 | 49 | 48 | 47 | 46 | 44 | 40 | 36 | 32 | 24 | 0 | | | | | |
| . . . | | | | | | | | | | | | | | | | | |
| Adding | 72, archive becomes: | 72 | 71 | 70 | 69 | 68 | 64 | 60 | 56 | 48 | 24 | 0 | | | | | |
| Adding | 73, archive becomes: | 73 | 72 | 71 | 70 | 69 | 68 | 64 | 60 | 56 | 48 | 24 | 0 | | | | |
| Adding | 74, archive becomes: | 74 | 73 | 72 | 71 | 70 | 68 | 64 | 60 | 56 | 48 | 24 | 0 | | | | |
| . . . | | | | | | | | | | | | | | | | | |
| Adding | 96, archive becomes: | 96 | 95 | 94 | 93 | 92 | 88 | 84 | 80 | 72 | 48 | 24 | 0 | | | | |
| Adding | 97, archive becomes: | 97 | 96 | 95 | 94 | 93 | 92 | 88 | 84 | 80 | 72 | 48 | 24 | 0 | | | |
| Adding | 98, archive becomes: | 98 | 97 | 96 | 95 | 94 | 92 | 88 | 84 | 80 | 72 | 48 | 24 | 0 | | | |
| . . . | | | | | | | | | | | | | | | | | |
| Adding | 168, archive becomes: | 168 | 167 | 166 | 165 | 164 | 160 | 156 | 152 | 144 | 120 | 96 | 72 | 48 | 24 | 0 | |
| Adding | 169, archive becomes: | 169 | 168 | 167 | 166 | 165 | 164 | 160 | 156 | 152 | 144 | 120 | 96 | 72 | 48 | 24 | |
| Adding | 170, archive becomes: | 170 | 169 | 168 | 167 | 166 | 164 | 160 | 156 | 152 | 144 | 120 | 96 | 72 | 48 | 24 | |

```
Filter is -1 0 1 2 3 4 8 12 16 24 48 72 96 120 144 168
Adding   0, archive becomes:   0
Adding   1, archive becomes:   1   0
Adding   2, archive becomes:   2   1   0
Adding   3, archive becomes:   3   2   1   0
Adding   4, archive becomes:   4   3   2   1   0
Adding   5, archive becomes:   5   4   3   2   1   0
Adding   6, archive becomes:   6   5   4   3   2   1   0
Adding   7, archive becomes:   7   6   5   4   3   2   1   0
Adding   8, archive becomes:   8   7   6   5   4   3   2   1   0
Adding   9, archive becomes:   9   8   7   6   5   4   3   2   1   0
Adding  10, archive becomes:  10   9   8   7   6   2   0
Adding  11, archive becomes:  11  10   9   8   7   6   2   0
Adding  12, archive becomes:  12  11  10   9   8   7   6   2   0
Adding  13, archive becomes:  13  12  11  10   9   8   7   6   2   0
Adding  14, archive becomes:  14  13  12  11  10   9   8   7   6   2   0
Adding  15, archive becomes:  15  14  13  12  11  10   9   8   7   6   2   0
Adding  16, archive becomes:  16  15  14  13  12  11  10   9   8   7   6   2   0
Adding  17, archive becomes:  17  16  15  14  13  12  11  10   9   8   7   6   2   0
Adding  18, archive becomes:  18  17  16  15  14  13  12  11  10   9   8   7   6   2   0
. . .
Adding  24, archive becomes:  24  23  22  21  20  19  18  17  16  12   8   6   0
Adding  25, archive becomes:  25  24  23  22  21  20  19  18  17  16  12   8   6   0
Adding  26, archive becomes:  26  25  24  23  22  21  20  19  18  17  16  12   8   6   0
. . .
Adding  32, archive becomes:  32  31  30  29  28  27  26  22  18  16   6   0
Adding  33, archive becomes:  33  32  31  30  29  28  27  26  22  18  16   6   0
Adding  34, archive becomes:  34  33  32  31  30  29  28  27  26  22  18  16   6   0
. . .
Adding  40, archive becomes:  40  39  38  37  36  32  28  26  16   0
Adding  41, archive becomes:  41  40  39  38  37  36  32  28  26  16   0
Adding  42, archive becomes:  42  41  40  39  38  37  36  32  28  26  16   0
. . .
Adding  48, archive becomes:  48  47  46  45  44  43  42  41  40  39  38  37  36  32  28  26  16   0
Adding  49, archive becomes:  49  48  47  46  45  44  43  42  41  40  39  38  37  36  32  28  26  16   0
Adding  50, archive becomes:  50  49  48  47  46  42  38  36  26  16   0
. . .
Adding  72, archive becomes:  72  71  70  69  68  67  66  62  58  56  46  36   0
Adding  73, archive becomes:  73  72  71  70  69  68  67  66  62  58  56  46  36   0
Adding  74, archive becomes:  74  73  72  71  70  69  68  67  66  62  58  56  46  36   0
. . .
Adding  96, archive becomes:  96  95  94  93  92  91  90  89  88  87  86  82  78  76  66  56  36   0
Adding  97, archive becomes:  97  96  95  94  93  92  91  90  89  88  87  86  82  78  76  66  56  36   0
Adding  98, archive becomes:  98  97  96  95  94  93  92  91  90  89  88  87  86  82  78  76  66  56  36
                               0
. . .
Adding 168, archive becomes: 168 167 166 165 164 163 162 161 160 159 158
                             157 156 152 148 146 136 116  96  76  36   0
Adding 169, archive becomes: 169 168 167 166 165 164 163 162 161 160 159
                             158 157 156 152 148 146 136 116  96  76  36   0
Adding 170, archive becomes: 170 169 168 167 166 162 158 156 146 136 116  76  36
```

Note that while the results are not identical, they exhibit the same characteristics as the prior example.

GD filters are not restricted to any particular patterns. They can be designed to be linear, hand crafted as in the above example, or they can be modeled after naturally occurring sequences such as logarithmic and Fibonacci progressions, or modeled after mathematically interesting progressions such as powers of two.

EXAMPLE 6

A Fibonacci filter

A=[-1t, 0t, 2t, 3t, 5t, 8t, 13t, 21t, 34t, 55t, 89t, 144t, 233t, 377t, 610t, 987t]

applied to the sequence t0, t3, t6, t9, . . . t1000 yields:

```
Filter is -1 0 2 3 5 8 13 21 34 55 89 144 233 377 610 987
Adding   0, archive becomes:   0
Adding   3, archive becomes:   3   0
Adding   6, archive becomes:   6   3   0
Adding   9, archive becomes:   9   6   3   0
Adding  12, archive becomes:  12   9   6   0
Adding  15, archive becomes:  15  12   9   6   0
Adding  18, archive becomes:  18  15  12   6   0
Adding  21, archive becomes:  21  18  15  12   0
Adding  24, archive becomes:  24  21  18  12   0
Adding  27, archive becomes:  27  24  21  18  12   0
```

-continued

| | | | | | | | | | | | |
|---|---|---|---|---|---|---|---|---|---|---|---|
| Adding | 30, archive becomes: | 30 | 27 | 24 | 18 | 12 | 0 | | | | |
| Adding | 33, archive becomes: | 33 | 30 | 27 | 24 | 12 | 0 | | | | |
| Adding | 36, archive becomes: | 36 | 33 | 30 | 24 | 12 | 0 | | | | |
| ... | | | | | | | | | | | |
| Adding | 984, archive becomes: | 984 | 981 | 978 | 972 | 960 | 936 | 912 | 864 | 768 | 384 | 0 |
| Adding | 987, archive becomes: | 987 | 984 | 981 | 978 | 972 | 960 | 936 | 912 | 864 | 768 | 384 | 0 |
| Adding | 990, archive becomes: | 990 | 987 | 984 | 978 | 972 | 960 | 936 | 912 | 864 | 768 | 384 |
| Adding | 993, archive becomes: | 993 | 990 | 987 | 984 | 972 | 960 | 912 | 864 | 768 | 384 |
| Adding | 996, archive becomes: | 996 | 993 | 990 | 984 | 972 | 960 | 912 | 864 | 768 | 384 |
| Adding | 999, archive becomes: | 999 | 996 | 993 | 990 | 984 | 972 | 960 | 912 | 864 | 768 | 384 |

EXAMPLE 7

A Base 2 filter

A=[−1t, 0t, 1t, 2t, 4t, 8t, 16t, 32t, 64t, 128t, 256t, 512t, 1024t, 2048t, 4096t, 8192t]
Applied to the sequence t0, t1, t2, . . . t1000 yields:

| Filter is | −1 | 0 | 1 | 2 | 4 | 8 | 16 | 32 | 64 | 128 | 256 | 512 | 1024 | 2048 | 4096 | 8192 |
|---|---|---|---|---|---|---|---|---|---|---|---|---|---|---|---|---|
| Adding 0, archive becomes: | 0 | | | | | | | | | | | | | | | |
| Adding 1, archive becomes: | 1 | 0 | | | | | | | | | | | | | | |
| Adding 2, archive becomes: | 2 | 1 | 0 | | | | | | | | | | | | | |
| Adding 3, archive becomes: | 3 | 2 | 1 | 0 | | | | | | | | | | | | |
| Adding 4, archive becomes: | 4 | 3 | 2 | 0 | | | | | | | | | | | | |
| Adding 5, archive becomes: | 5 | 4 | 3 | 2 | 0 | | | | | | | | | | | |
| Adding 6, archive becomes: | 6 | 5 | 4 | 2 | 0 | | | | | | | | | | | |
| Adding 7, archive becomes: | 7 | 6 | 5 | 4 | 0 | | | | | | | | | | | |
| Adding 8, archive becomes: | 8 | 7 | 6 | 4 | 0 | | | | | | | | | | | |
| Adding 9, archive becomes: | 9 | 8 | 7 | 6 | 4 | 0 | | | | | | | | | | |
| Adding 10, archive becomes: | 10 | 9 | 8 | 6 | 4 | 0 | | | | | | | | | | |
| ... | | | | | | | | | | | | | | | | |
| Adding 990, archive becomes: | 990 | 989 | 988 | 986 | 984 | 976 | 960 | 928 | 896 | 768 | 512 | 0 | | | | |
| Adding 991, archive becomes: | 991 | 990 | 989 | 988 | 984 | 976 | 960 | 928 | 896 | 768 | 512 | 0 | | | | |
| Adding 992, archive becomes: | 992 | 991 | 990 | 988 | 984 | 976 | 960 | 928 | 896 | 768 | 512 | 0 | | | | |
| Adding 993, archive becomes: | 993 | 992 | 991 | 990 | 988 | 984 | 976 | 960 | 896 | 768 | 512 | 0 | | | | |
| Adding 994, archive becomes: | 994 | 993 | 992 | 990 | 988 | 984 | 976 | 960 | 896 | 768 | 512 | 0 | | | | |
| Adding 995, archive becomes: | 995 | 994 | 993 | 992 | 988 | 984 | 976 | 960 | 896 | 768 | 512 | 0 | | | | |
| Adding 996, archive becomes: | 996 | 995 | 994 | 992 | 988 | 984 | 976 | 960 | 896 | 768 | 512 | 0 | | | | |
| Adding 997, archive becomes: | 997 | 996 | 995 | 994 | 992 | 984 | 976 | 960 | 896 | 768 | 512 | 0 | | | | |
| Adding 998, archive becomes: | 998 | 997 | 996 | 994 | 992 | 984 | 976 | 960 | 896 | 768 | 512 | 0 | | | | |
| Adding 999, archive becomes: | 999 | 998 | 997 | 996 | 992 | 984 | 976 | 960 | 896 | 768 | 512 | 0 | | | | |
| Adding 1000, archive becomes: | 1000 | 999 | 998 | 996 | 992 | 984 | 976 | 960 | 896 | 768 | 512 | 0 | | | | |

EXAMPLE 8

Initial File Added and Never Changed

The class of GD filters described above guarantee that a revision set with at least a single revision, will always contain at least a single revision. This is because in addition to keeping at least one revision found within each age interval, we always keep the most recent revision, regardless of whether it maps to an age interval of the GD filter. This is important, since many files are created once and then never changed. Examples include operating system and application files which are created at installation but otherwise unchanged by the user.

Assume the following linear filter:

A[−1t, 0t, 1t, 2t, 3t, 4t, 5t, 6t, 7t, 8t, 9t, 10t, 11t, 12t, 13t, 14t]

Here is the content of the revision set over time with the sole object revision added at time t0 and the filter applied once per time period:

| Filter is | −1 0 1 2 3 4 5 6 7 8 9 10 11 12 13 14 |
|---|---|
| Adding | 0, archive becomes: 0 |
| Pruning at | 0, archive becomes: 0 |
| Pruning at | 1, archive becomes: 0 |
| Pruning at | 2, archive becomes: 0 |
| Pruning at | 3, archive becomes: 0 |
| Pruning at | 4, archive becomes: 0 |
| Pruning at | 5, archive becomes: 0 |
| ... | |
| Pruning at | 994, archive becomes: 0 |
| Pruning at | 995, archive becomes: 0 |
| Pruning at | 996, archive becomes: 0 |
| Pruning at | 997, archive becomes: 0 |
| Pruning at | 998, archive becomes: 0 |
| Pruning at | 999, archive becomes: 0 |
| Pruning at | 1000, archive becomes: 0 |

Enhanced GD Algorithm and Data Structures

There are some special cases that occur in common usage of a file system that we must properly handle. Specifically, files and directories can be renamed, and files and directories can be deleted and then new files reusing the same name created. In addition, there may be cases where we choose to tag specific revisions for preservation even where the GD filter would remove them. For example, when the SA 6 first copies an entire protected file system to the archive volume 54, we might wish to keep that very first copy, regardless of any changes that occur later in time.

To facilitate our enhanced GD algorithm, we define the following key data structures used by the Archive Manager 74 to represent stored data:

FileData Datatype

This data structure is an implementation-dependent representation of a file, including its contents such as the text of a document or executable code of a program, as well as information which represents file system security control such as who can read or execute the file as well as other attributes such as whether this is a file or directory, hidden or system file, file create time, last file modified time, etc.

Note that as used by the Archive Manager 74, all elements of the file data structure correspond to a specific revision of a file, not to the current instance of the file in the protected file system.

```
Typedef FileData {
    "Implementation-specific"
};
```

TimeStamp Datatype

This data structure is a representation of date and time, represented as an integer, with a resolution at least as fine-grained as that in use by the protected file system. For example, if the protected file system time granularity is 1 microsecond, the granularity of the TimeStamp must be <=1 microsecond.

Typedef TimeStamp {Integer};

RevIdent Datatype

This data structure is a unique identifier for this specific revision, represented as an integer.

Typedef RevIdent {Integer};

Tag Datatype

This data structure is a label or tag, which can be applied to a particular revision. It is represented as a sequence of Unicode characters.

Typedef Tag {CharacterString};

Revision Datatype

The Revision datatype contains all information relevant to representing and recording a single revision of a single file system object. It contains a FileData object with the actual representation of the specific revision of the file system object, a TimeStamp identifying the data and time of last modification corresponding to this revision, a RevIdent uniquely identifying this revision among the set of revisions for a file system object, a set of all tags associated with this revision of the file system object, and finally a Bool indicating whether this Revision records a delete event rather than recording new contents for the protected file system object.

```
Typedef Revision {
    FileData data;      // A revision of the file, including normal file
                        // contents, and file system specific information
                        // such as security, type, attribute, and date
                        // information.
    TimeStamp ts;       // The specific timestamp associated with this
                        // particular revision; derived from the "data"
                        // element but kept separate and in a form suitable
                        // for fast access.
    RevIdent id;        // A unique revision number associated with this
                        // revision of the file system object.
    Set of Tags tags;   // A set of tags which match this revision of the
                        // object.
    Bool is_delete;     // If FALSE, this is a normal record. If TRUE,
                        // then this Revision notes a delete event and the
                        // data and tags elements are invalid.
};
```

FileIdent Datatype

The FileIdent datatype represents a key that uniquely identifies an object within a protected file system. The form of FileIdent is implementation-dependent.

If the file system is catalogued by human-readable file pathnames, then FileIdent is represented as a string of ANSI or Unicode characters. For example, "c: \Documents and Settings\Administrator":

Typedef Tag {CharacterString};

Alternatively, it is also possible to index by the file system's internal indexing method such as FRN (file reference number) in Windows or inodes in Unix:

Typedef Tag {Integer};

FileObject Datatype

The FileObject datatype is the representation in the Archive Manager 74's database of a file system object, including all revisions archived. It has two elements. The first is a name for the object. This name uniquely identifies the file system object within the protected file system and also indexes into the Archive Manager 74 to find all associated archived revisions of the protected file system object. The second is a set of all Revision data structures associated with this name, which is quite simply the set of all revisions of the protected file system object represented in the Archive Manager 74.

```
Typedef Object {
    FileIdent name;       // Identification of the specific file, such as
                          // full pathname of the file within the protect-
                          // ed file system.
    Set of Revision revs; // A set of all revisions present in the
                          // archive.
};
```

Enhanced GD Algorithm

Here's an enhanced algorithm which, together with the above described data structures, supports file system object renaming and deletion, and tags, as described below. As before, this routine takes a filter to apply, the time relative to which the filter should be applied, and the revision set to which the filter will be applied. It returns the updated revision set.

```
Set of Revision GD(
    Timestamp now;          // Time relative to which the filter
                            // will be applied.
    Array of Integer A[0 . . . n],  // Array containing coefficients for
                            // n age intervals.
    Integer n,              // count of age intervals
    Set of Revision R{ },   // set of revisions to be filtered
    Integer m               // number of revisions in R
)
{
```

```
// Temporary Sets of Revisions used by the algorithm.
Set of Revision R_normal := { };
Set of Revision R_delete := { };
Set of Revision R_tagged := { };
Set of Revisions NEWR := { };
Set of Revisions RESULT := { };
// Identify normal and delete revisions.
FOR EACH REVISION e in SET R {
    If (e.is_delete == FALSE)
        R_normal := union( R_normal, e );
    Else
        R_delete := union( R_delete, e );
}
// Keep track of all tagged revisions.
FOR EACH REVISION e in SET R_normal {
    If (e.tags != { })
        R_tagged := union( R_tagged, e );
}
// Apply the standard GD filter to all normal revisions.
FOR EACH INTEGER i FROM 0 TO n-1 INCLUSIVE {
    Set TMP := { };
    FOR EACH REVISION e in SET R normal {
        If (e.ts >= (now - A[i+1]) AND e.ts < (now - A[i]))
            TMP := union( TMP, e );
    }
    If (TMP != { })
        NEWR := union( NEWR, min( TMP ));
}
NEWR := union( NEWR, max( R_normal ));
// Make sure the revision set contains all tagged and deleted revisions.
NEWR := union( NEWR, R_tagged );
NEWR := union( NEWR, R_deleted );
// Now scan the revision set, deleting redundant delete revisions,
// keeping just the oldest of each adjacent group.
Bool LAST_WAS_DEL := TRUE;
Bool FIRST_REVISION := TRUE;
FOR EACH REVISION e FROM OLDEST TO NEWEST in SET
NEWR {
    IF (e.is_deleted) {
        If (FIRST_REVISION)
            ; // forget this revision;
        Else If (LAST_WAS_DEL)
            ; // forget this revision
        Else {
            RESULT := union( RESULT, e ); // keep this delete
            LAST_WAS_DEL := TRUE; // remember we saw a
                delete
        }
    }
    else {
        RESULT := union( RESULT, e ); // keep this revision
        LAST_WAS_DEL := FALSE; // remember it was normal
    }
    FIRST_REVISION := FALSE;
}
// RESULT now contains our new Set of Revisions.
Return RESULT;
}
```

Deleted Files

If we are only concerned with being able to restore each saved revision of a file system object, then we can ignore file deletes. However, if we're interested in restoring larger units such as directory trees or even file system volumes at particular points in time, then we need to track file deletions in addition to file creation and file modification events. Consider the following sequence of events:

| TimeIndex | File System Action |
| --- | --- |
| 0 | Create Directory D (rev1) |
| 1 | Create File D/A (rev1) |
| 2 | Modify D/A (rev2) |
| 3 | Delete D/A |

| TimeIndex | File System Action |
| --- | --- |
| 4 | Create File D/B (rev1) |
| 5 | Modify File D/B (rev2) |
| 6 | Delete File D/B |
| 7 | Create File D/A (rev3) |
| 8 . . . | "no further changes" |

The following table shows what will be restored for each time index both in a system which tracks file creation and modification but not deletion (left), and in a system that tracks deletion in addition to creation and modification (right):

| TimeIndex | Archive Action (no delete handling) | Archive Action (with delete handling) |
| --- | --- | --- |
| 0 | "empty" | "empty" |
| 1 | D/A (rev1) | D/A (rev1) |
| 2 | D/A (rev2) | D/A (rev2) |
| 3 | D/A (rev2) | |
| 4 | D/A (rev2), D/B (rev1) | D/B (rev1) |
| 5 | D/A (rev2), D/B (rev2) | D/B (rev2) |
| 6 | D/A (rev2), D/B (rev2) | |
| 7 | D/A (rev3), D/B (rev2) | D/A (rev3) |
| 8 . . . | D/A (rev3), D/B (rev2) | D/A (rev3) |

It's clear that both approaches retain the same archived data, but the example "with delete handling" exhibits much more desirable characteristics for restoring large units of data such as directory trees.

It is worth noting that traditional backup software exhibits behavior similar to the "no delete handling" case.

Algorithmic Handling of Deletes

Our preferred approach to handling delete events is to record them all. Then, when the GD filter is applied, they are handled specially. Specifically, the standard GD filtering process is applied to the non-delete revisions. Then, the union of the resulting revision set and all delete revisions input to the GD filter are ordered by date from oldest to most recent. Whenever, two or more delete revisions are adjacent, all but the oldest are removed. Additionally, if the oldest revision is a delete revision, it is discarded.

As a result, all delete/create boundaries will be properly represented. We keep the oldest of any adjacent group of delete events since it will provide the most accurate representation of the file system over time. Because delete revisions have no associated file data, they are very small and the cost of representing them is very low. Additionally, after filtering, it is easy to show that for a file system object with n non-delete revisions in the archive, there will never be more than n delete revisions present, so the overhead in complexity is quite small.

EXAMPLE

Delete Handling

Here is an example of a base-2 filter:
A[-1t, 0t, 1t, 2t, 4t, 8t, 16t, 32t, 64t, 128t, 256t, 512t, 1024t, 2048t, 4096t, 8192t]

showing the behavior of the GD algorithm with delete handling as applied to a set of create/mod revisions (c) and delete revisions (d) over time.

In this example, a particular file name is used to create, modify (0 or more times), and then delete the file. This process is done repeatedly. The contents of the archive over time showing object changes (including deletions) is shown with the filter applied at each time period t0, t1, ... t1000 with the resulting revision set at each time period:

Tagged Revisions

It may be desirable to label and retain some revisions forever. The Archive Manager 74 provides a means to label or tag, particular revisions with a symbol name. Our enhanced GD algorithm retains all tagged revisions indefinitely. Through other database operations provided by the

| Filter is | −1 | 0 | 1 | 2 | 4 | 8 | 16 | 32 | 64 | 128 | 256 | 512 | 1024 | 2048 | 4096 | 8192 |
|---|---|---|---|---|---|---|---|---|---|---|---|---|---|---|---|---|
| At 0 adding | 0(c), archive becomes: | 0(c) | | | | | | | | | | | | | | |
| At 1 adding | 1(d), archive becomes: | 1(d) | 0(c) | | | | | | | | | | | | | |
| At 2 adding | 2(c), archive becomes: | 2(c) | 1(d) | 0(c) | | | | | | | | | | | | |
| At 3 adding | 3(c), archive becomes: | 3(c) | 2(c) | 1(d) | 0(c) | | | | | | | | | | | |
| At 4 adding | 4(d), archive becomes: | 4(d) | 3(c) | 2(c) | 1(d) | 0(c) | | | | | | | | | | |
| At 5 adding | 5(c), archive becomes: | 5(c) | 4(d) | 3(c) | 2(c) | 1(d) | 0(c) | | | | | | | | | |
| At 6 adding | 6(c), archive becomes: | 6(c) | 5(c) | 4(d) | 2(c) | 1(d) | 0(c) | | | | | | | | | |
| At 7 adding | 7(c), archive becomes: | 7(c) | 6(c) | 5(c) | 1(d) | 0(c) | | | | | | | | | | |
| At 8 adding | 8(d), archive becomes: | 8(d) | 7(c) | 6(c) | 5(c) | 1(d) | 0(c) | | | | | | | | | |
| At 9 adding | 9(c), archive becomes: | 9(c) | 8(d) | 7(c) | 5(c) | 1(d) | 0(c) | | | | | | | | | |
| At 10 adding | 10(c), archive becomes: | 10(c) | 9(c) | 8(d) | 7(c) | 5(c) | 1(d) | 0(c) | | | | | | | | |
| At 11 adding | 11(c), archive becomes: | 11(c) 0(c) | 10(c) | 9(c) | 8(d) | 7(c) | 5(c) | 1(d) | | | | | | | | |
| At 12 adding | 12(c), archive becomes: | 12(c) 0(c) | 11(c) | 10(c) | 9(c) | 8(d) | 5(c) | 1(d) | | | | | | | | |
| At 13 adding | 13(d), archive becomes: | 13(d) 0(c) | 12(c) | 11(c) | 9(c) | 8(d) | 5(c) | 1(d) | | | | | | | | |
| At 14 adding | 14(c), archive becomes: | 14(c) | 13(d) | 12(c) | 11(c) | 9(c) | 1(d) | 0(c) | | | | | | | | |
| At 15 adding | 15(c), archive becomes: | 15(c) | 14(c) | 13(d) | 11(c) | 9(c) | 1(d) | 0(c) | | | | | | | | |
| At 16 adding | 16(c), archive becomes: | 16(c) | 15(c) | 14(c) | 13(d) | 9(c) | 1(d) | 0(c) | | | | | | | | |
| At 17 adding | 17(c), archive becomes: | 17(c) 0(c) | 16(c) | 15(c) | 14(c) | 13(d) | 9(c) | 1(d) | | | | | | | | |
| At 18 adding | 18(c), archive becomes: | 18(c) 0(c) | 17(c) | 16(c) | 14(c) | 13(d) | 9(c) | 1(d) | | | | | | | | |
| At 19 adding | 19(d), archive becomes: | 19(d) 1(d) | 18(c) 0(c) | 17(c) | 16(c) | 14(c) | 13(d) | 9(c) | | | | | | | | |
| At 20 pruning, | archive becomes: | 19(d) | 18(c) | 16(c) | 14(c) | 13(d) | 9(c) | 1(d) | 0(c) | | | | | | | |
| At 21 pruning, | archive becomes: | 19(d) | 18(c) | 14(c) | 13(d) | 9(c) | 1(d) | 0(c) | | | | | | | | |
| At 22 pruning, | archive becomes: | 19(d) | 18(c) | 14(c) | 13(d) | 9(c) | 1(d) | 0(c) | | | | | | | | |
| At 23 pruning, | archive becomes: | 19(d) | 18(c) | 13(d) | 9(c) | 1(d) | 0(c) | | | | | | | | | |
| At 24 pruning, | archive becomes: | 19(d) | 18(c) | 13(d) | 9(c) | 1(d) | 0(c) | | | | | | | | | |
| At 25 pruning, | archive becomes: | 19(d) | 18(c) | 13(d) | 9(c) | 1(d) | 0(c) | | | | | | | | | |
| At 26 pruning, | archive becomes: | 19(d) | 18(c) | 1(d) | 0(c) | | | | | | | | | | | |
| ... | | | | | | | | | | | | | | | | |
| At 1000 pruning, | archive becomes: | 19(d) | 18(c) | 1(d) | 0(c) | | | | | | | | | | | |

Note that all delete/create boundaries are preserved.

Renamed Files

Renamed files are another special case. However, renamed files can be easily handled outside of the GD algorithm by reducing rename operations to a sequence of file creates and deletes. Specifically, there are two cases to consider.

First, A is renamed to B where B does not exist. This is equivalent (from the perspective of the Archive Manager 74) to the following sequence:
Create B
Delete A Second, A is renamed to B where B does exist. This is equivalent (from the perspective of the Archive Manager 74) to the following sequence:
Delete B
Create B
Delete A In the immediately preceding sequence, the "Delete B" revision is necessary to explicitly indicate that the result of the rename operation is replacing B with a new file, not a new revision of the old file.

Obviously, the proper data must be included with each revision presented to the Archive Manager 74. The key point is that rename operations are easily managed without special processing by the GD algorithm.

Archive Manager 74, tags can also be removed when they are no longer needed, allowing the GD algorithm to prune such data when its retention is no longer critical.

Using symbolic tags provides a powerful means for a user to easily recover information using terminology familiar to the user.

A couple examples follow.

Initial File System Image

It may be desirable to retain the very first copy of the protected file system placed into the Archive Manager 74's archive. After the copy is complete, a tag such as "Initial File System Image" could be applied to that initial revision of each and every file system object represented in the archive. It would then be possible to retrieve a copy of that initial image at any point in the future by searching for tag "Initial File System Image" for all objects in the archive and restoring the appropriate revision for all matching objects.

Important User Files

After making some critical changes, a user could tag the specific files that should be kept forever. For example, after completing the quarterly inventory process, the user could tag the current revision of each inventory database file with an appropriate label such as "2Q2002 Inventory Final". This revision, once archived as a permanent file, will never be deleted except, of course, upon the express instruction of the user.

The Integrated Archival System

Figure 5:
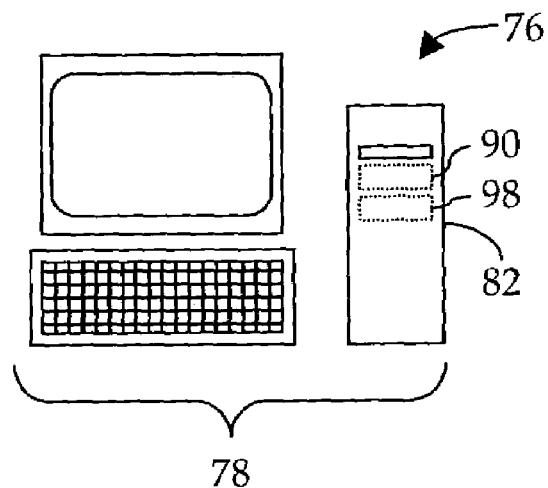
FIG. 5 is a block representation of a digital data processing system including a conventional personal computer or PC, and an archival system constructed in accordance with a preferred, integrated embodiment of our invention.

Shown in FIG. 5 is an integrated system 76 comprising a personal computer that we shall refer to as our Client 78, but into which we have tightly integrated a Server 80 (see, FIG. 7) constructed in accordance with an integrated embodiment of our invention. By integrated we mean that both the protected volume and the archive are contained within, and integrated into, a single enclosure 82.

Figure 6:
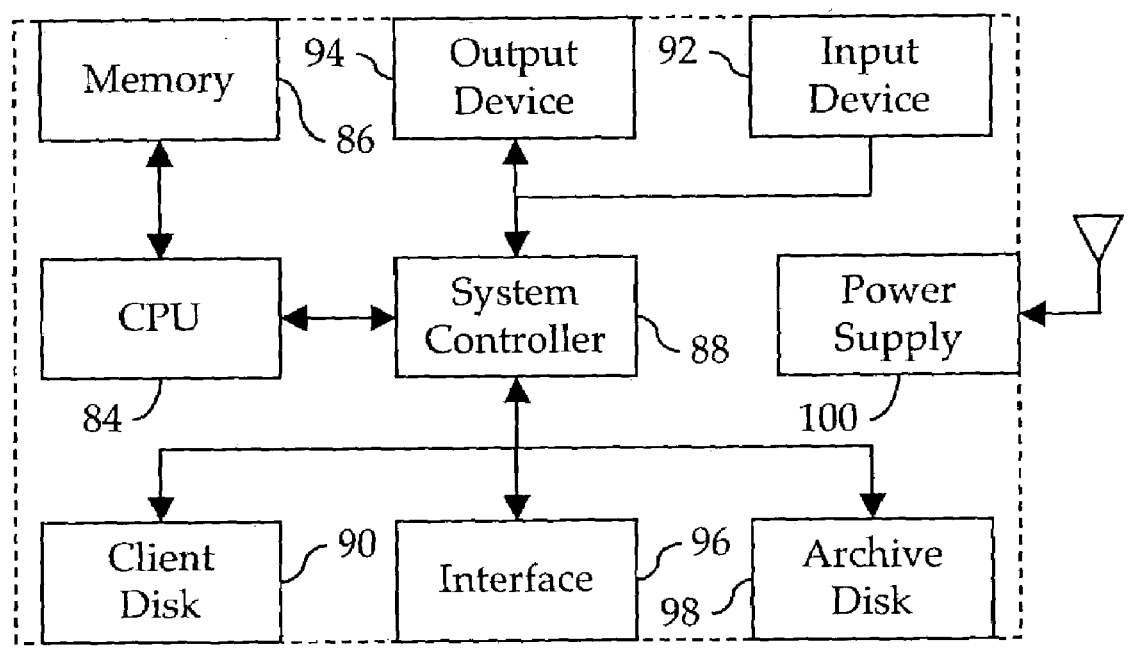
FIG. 6 is a diagrammatic representation of the main hardware components of the system shown in FIG. 5.

As shown in greater detail in FIG. 6, Client 78 is comprised of a central processing unit, CPU 84, which is coupled directly to main memory 86, and a system controller 88 which is coupled to a hard disk, Client Disk 90, an input device 92, such as a keyboard, an output device 94, such as a monitor, and a high-speed interface 96 which may implement any of the known high-speed communication protocols. In contrast to the Client 4 shown in FIG. 1, however, the Client 78 also includes a second hard disk, Archive Disk 98 that is reserved exclusively for archival purposes. A power supply 100 provides operating power to all of the components comprising the Client 78.

Figure 7:
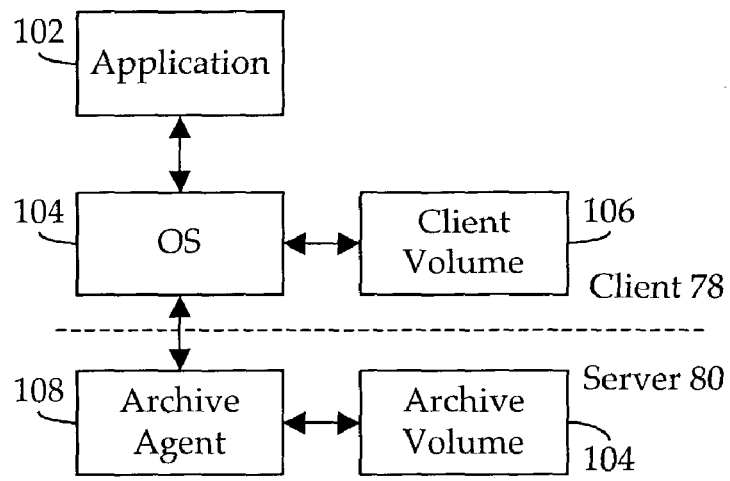
FIG. 7 is a high-level diagrammatic representation of the main software components of the system shown in FIG. 5.

Shown generally in FIG. 7 are the main software components of the integrated system 76. As is conventional in Client 78, an application 102, such as a word processing or spreadsheet program, executes under control of an operating system, OS 104, to create, modify or delete data files stored in a client volume 106. Within the context of the specific hardware configuration shown in FIG. 6, both the application 102 and the OS 104 will, during the execution thereof by the CPU 84, reside, at least in part, in the main memory 86, and will make use of the system controller 88 on an as-required basis to interact with the user via the input device 92 and the output device 94, in order to implement requested actions relative to the client volume 106 resident on the Client Disk 90.

Figure 8:
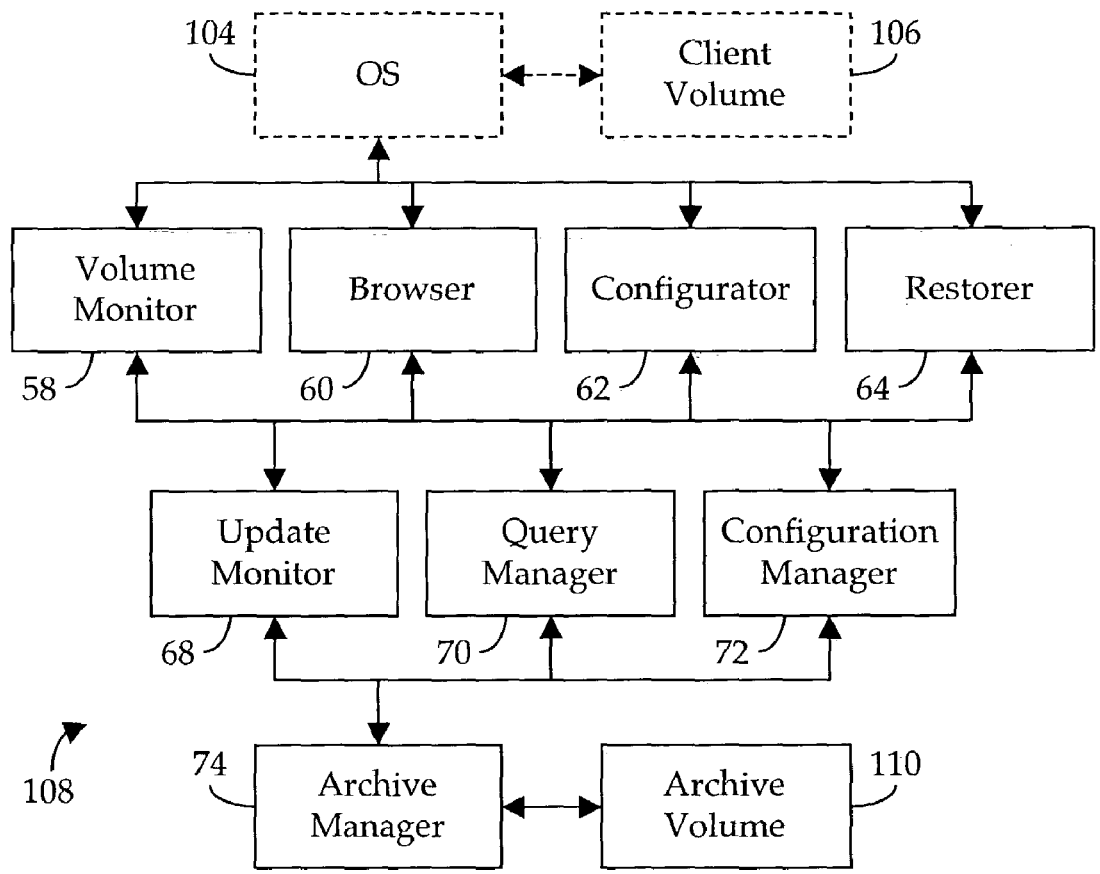
FIG. 8 is a diagrammatic representation of the archive agent shown in FIG. 7.

In contrast to the software configuration shown in FIG. 3, the main software components of our archival system consist of an Archive Agent 108, adapted to reside within the Client 78 and to interact directly with the OS 104 to automatically maintain an archive of the contents of the client volume 106 in an archive volume 110, resident on the Archive Disk 98. As shown in FIG. 8, the Archive Agent 108 includes all of the components of both the Client Agent 50 and the Server Agent 52 of our stand-alone system 2, except for the CCI 56 and the SCI 66 which are not required in our integrated system 76. In the latter system, communication between, on the one hand, the Volume Monitor 58, Browser 60, Configurator 62, or the Restorer 64, and, on the other hand, the Update Monitor 68, Query Manager 70 or Configuration Manager 72, can be accomplished using any of the known inter-process communication techniques, such as OS function calls or OS-facilitated message passing using either disk- or memory-mapped data structures.

Just as in our stand-alone system 2, our integrated system 76 reserves a separate disk exclusively for the archive. The distinction is important: in either of our archival systems, there are disk(s) available for normal file operations and there are disk(s) for the exclusive use of the archival server. In an example implementation, the archive disk will be a normal industry standard disk drive connected using normal, industry standard interconnects (e.g., IDE, SCSI, USB). Through coordination with standard system software including the OS, the archival software has exclusive access to the disk allocated exclusively for archival use.

In the case of our stand-alone system 2 in which the SA 6 in implemented as a separate hardware unit, access to the Archive Disk 34 is strictly controlled by the Server Agent 52. However, enforcing exclusive access to the Archive Disk 98 in the integrated system 76 is a bit more complicated. We are concerned both with unauthorized access to stored data as well as inadvertent damage or deletion of the data. This latter issue is critically important since in the event of a system failure, the administrator may reinstall the operating system and we definitely want the data stored on the archive volume 110 available for system restoration!

In general, our primary concerns in this regard are:

Case A: If the Archive Disk 98 is generally available, it may be possible for a sophisticated user to programmatically access or even modify data of another user to which they should not be permitted access.

Case B: If the Archive Disk 98 is formatted in a native format of the OS on the Client 78, then the Archive Disk 98 may be subject to programmatic attack by a virus, worm, or similar destructive entity.

Case C: If the system is booted with an OS which is not aware of the existence of the Archive Agent 108, the Archive Disk 98 could be inadvertently erased or damaged.

Case D: Various disk utilities could be used to inadvertently erase, damage, or reformat the Archive Disk 98.

In general, there are several possible approaches to securing the Archive Disk 98 all of which presume adequate physical security of the computer containing that disk. The methods described here are not designed to protect the Archive Disk 98 from hostile intent in a physically insecure environment. In this regard, our primary goal is to protect the Archive Disk 98 from unlawful programmatic attack by an unauthorized user or program, and protection against accidental damage from an authorized user.

Archive Disk 98 uses Native Format

Protection against Case A can be provided using a normal file system format. For example, if the OS 104 is Windows XP Professional, the archive volume 110 can be formatted as an NTFS 5.0 partition. Protection against Case A is trivial in this case. The system administrator must set the protections of all top-level file and directory structures on the Archive Disk 98 to preclude access by all but privileged users. Using the standard Browser 60 and Restorer 64, non-privileged users can still access all backed up data to which they are properly entitled access.

Note that this solution offers no protection against Case D because viruses and related programs may run with all necessary privileges to access the disk. This approach requires no special hardware or software. It requires the administrator of the system to properly set the security of the Archive Disk 98.

Archive Disk 98 uses Non-Native Format

Simple protection against Cases A, B, C, and D can be provided by formatting the Archive Disk 98 in a way that the OS recognizes as valid data, but data it doesn't know how to access. For example, if the OS 104 is Windows XP Professional, the Archive Disk 98 can be formatted as a Linux partition, which Windows will recognize as a Healthy, but Unknown partition type. In such a configuration, the Archive Agent 108 will access the Archive Disk 98 via a special disk driver which understands the format of the Archive Disk 98. Because the disk is in a non-standard format and accessible only via the special driver, we have addressed Case A.

Cases B and C are addressed because most installers and utilities will note the unusual format and either leave it alone or warn the administrator doing the reinstall or disk maintenance work. Additionally, the Archive Disk 98 can be labeled with an obvious name like "Archive" to warn the administrator that the archive volume 110 should not be thoughtlessly erased or modified.

Case D is addressed because most viruses and related programs issue attacks against files and not against disks or partitions, although certain viruses have been known to reformat the C: drive. In our case, we are non-native so no files or directories are visible and additionally, the Archive Disk 98 is not mounted (from the perspective of normal code) and has no associated mount point or drive letter, so it will be difficult for the virus to find.

Archive Disk 98 includes Hardware Interlock

An approach that provides strong protection requires special hardware. Effectively, the Archive Disk 98 requires a special enabling command before general access is permitted. In this mode, the Archive Disk 98 is present in the system and either properly enumerated at boot time (e.g., IDE, SCSI) or when power is applied (e.g., USB). In the former case, a special command must be issued to the Archive Disk 98 before it can be accessed for use. Such an enabling command could, for example, be a request to a particular sequence of disk sectors which are beyond the addressable range of the drive. In the latter case, there could simply be a special hardware register which must be written to enable power to a USB Archive Disk 98. The value of this latter approach is that the Archive Disk 98 is truly inaccessible unless and until an archive-aware OS is running on the hardware, effectively providing strong protection against each of Cases A, B, C, and D.

Thus it is apparent that we have provided a method and apparatus for efficiently archiving the contents of an on-line file system. In particular, we have disclosed both a stand-alone and an integrated archival system that, with minimal user interaction, efficiently and automatically archives the contents of one or more selected client volumes stored on an on-line file system. In addition, the systems that we have disclosed are specially adapted to gracefully discard older versions of current files in the client volume so as to reduce the storage requirements of the archive volume, thereby extending the effective operating period of the system until user action is required. Those skilled in the art will recognize that modifications and variations can be made without departing from the spirit of our invention. Therefore, we intend that our invention encompass all such variations and modifications as fall within the scope of the appended claims.

What we claim is:

1. In a digital data processing system having a first file storage system adapted to store a first file, a method for archiving said stored file, comprising:
providing a second file storage system adapted to store files;
storing in said second file storage system a first copy of said first file;
storing in a first record the time said first copy is stored in said second file storage system;
selectively applying a predetermined graceful degradation filter to said first record, the filter comprising at least:
a first age interval criterion adapted to select said first copy for retention if said first copy is the most recent copy of said first file stored in said second file storage system; and
a second age interval criterion adapted to select said first copy for retention if said first copy is the only copy of said first file stored in said second file storage system; and if said first copy is not selected for retention by said filter, deleting said first copy from said second file storage system.

2. The method of claim 1 further comprising:
if said first file is thereafter modified:
storing in said second file storage system a second copy of said modified first file; and
storing in a second record said state of said selected condition existent as of the time said second copy is stored in said second file storage system; and
wherein said filter criteria are selectively applied to said first and second records.

3. The method of claim 2 further comprising:
if said modified first file is thereafter deleted, storing in a third record said state of said selected condition existent as of the time said modified first file is deleted from said first file storage system; and
wherein said filter criteria are selectively applied to said first, second and third records.

4. The method of claim 1 further comprising:
if said first file is thereafter deleted, storing in a third record said state of said selected condition existent as of the time said first file is deleted from said first file storage system; and
wherein said filter criteria are selectively applied to said first and third records.

5. The method of claim 1 wherein said filter is a selected one of:
a linear filter:
with infrequent changes;
with frequent changes;
crafted;
lazy;
Fibonacci; and
Base-2.

6. The method of claim 1 wherein said filter is specially adapted to permanently retain in said second file system said first copy of said first file if, after said first copy of said first file is initially stored in said second file system, said first file is never thereafter modified in or deleted from said first file system.

7. The method of claim 1 wherein said filter is specially adapted to permanently retain in said second file system said first copy of said first file even if, after said first copy of said first file is initially stored in said second file system, said first file is thereafter deleted from said first file system.

8. The method of claim 1 wherein said filter is specially adapted to selectively retain permanently in said second file system said first copy of said first file.

9. The method of claim 1 wherein said first file system is contained within a first enclosure and said second file system is contained within a second enclosure independent of said first enclosure.

10. The method of claim 1 wherein said first file system and said second file system are both contained within a single first enclosure.

11. A digital data processing system having a first file storage system adapted to store a first file, the system comprising:
a second file storage system adapted to store files;
a storage agent adapted to:
store in said second file storage system a first copy of said first file;
store in a first record a state of a selected condition existent as of the time said first copy is stored in said second file storage system;

selectively apply a predetermined graceful degradation filter to said first record, the filter comprising at least:
- a first age interval criterion adapted to select said first copy for retention if said first copy is the most recent copy of said first file stored in said second file storage system; and
- a second age interval criterion adapted to select said first copy for retention if said first copy is the only copy of said first file stored in said second file storage system; and if said first copy is not selected for retention by said filter, delete said first copy from said second file storage system.

12. The system of claim 11 further comprising:
if said first file is thereafter modified, the storage agent:
- stores in said second file storage system a second copy of said modified first file; and
- stores in a second record said state of said selected condition existent as of the time said second copy is stored in said second file storage system; and wherein said filter criteria are selectively applied to said first and second records.

13. The system of claim 12 further comprising:
if said modified first file is thereafter deleted, the storage agent stores in a third record said state of said selected condition existent as of the time said modified first file is deleted from said first file storage system; and
wherein said filter criteria are selectively applied to said first, second and third records.

14. The system of claim 11 further comprising:
if said first file is thereafter deleted, the storage agent stores in a third record said state of said selected condition existent as of the time said first file is deleted from said first file storage system; and
wherein said filter criteria are selectively applied to said first and third records.

15. The system of claim 11 wherein said filter is a selected one of:
a linear filter:
- with infrequent changes;
- with frequent changes;
crafted;
lazy;
Fibonacci; and
Base-2.

16. The system of claim 11 wherein said filter is specially adapted to permanently retain in said second file system said first copy of said first file if, after said first copy of said first file is initially stored in said second file system, said first file is never thereafter modified in or deleted from said first file system.

17. The system of claim 11 wherein said filter is specially adapted to permanently retain in said second file system said first copy of said first file even if, after said first copy of said first file is initially stored in said second file system, said first file is thereafter deleted from said first file system.

18. The system of claim 11 wherein said filter is specially adapted to selectively retain permanently in said second file system said first copy of said first file.

19. The system of claim 11 wherein said first file system is contained within a first enclosure and said second file system is contained within a second enclosure independent of said first enclosure.

20. The system of claim 11 wherein said first file system and said second file system are both contained within a single first enclosure.

21. A storage agent for use in a digital data processing system having a first file storage system adapted to store a first file, the storage agent comprising:
a second file storage system adapted to store files;
wherein the storage agent is adapted to:
- store in said second file storage system a first copy of said first file;
- store in a first record a state of a selected condition existent as of the time said first copy is stored in said second file storage system;
- selectively apply a predetermined graceful degradation filter to said first record, the filter comprising at least:
  - a first age interval criterion adapted to select said first copy for retention if said first copy is the most recent copy of said first file stored in said second file storage system; and
  - a second age interval criterion adapted to select said first copy for retention if said first copy is the only copy of said first file stored in said second file storage system; and
- if said stored state of said selected condition satisfies said criteria, delete said first copy from said second file storage system.

22. The storage agent of claim 21 further comprising:
if said first file is thereafter modified, the storage agent:
- stores in said second file storage system a second copy of said modified first file; and
- stores in a second record said state of said selected condition existent as of the time said second copy is stored in said second file storage system; and wherein said filter criteria are selectively applied to said first and second records.

23. The storage agent of claim 22 further comprising:
if said modified first file is thereafter deleted, the storage agent stores in a third record said state of said selected condition existent as of the time said modified first file is deleted from said second file storage system; and
wherein said filter criteria are selectively applied to said first, second and third records.

24. The storage agent of claim 21 further comprising:
if said first file is thereafter deleted, the storage agent stores in a third record said state of said selected condition existent as of the time said first file is deleted from said first file storage system; and
wherein said filter criteria are selectively applied to said first and third records.

25. The storage agent of claim 21 wherein said filter is a selected one of:
a linear filter:
- with infrequent changes;
- with frequent changes;
crafted;
lazy;
Fibonacci; and
Base-2.

26. The storage agent of claim 21 wherein said filter is specially adapted to permanently retain in said second file system said first copy of said first file if, after said first copy of said first file is initially stored in said second file system, said first file is never thereafter modified in or deleted from said first file system.

27. The storage agent of claim 21 wherein said filter is specially adapted to permanently retain in said second file system said first copy of said first file even if, after said first copy of said first file is initially stored in said second file system, said first file is thereafter deleted from said first file system.

28. The storage agent of claim 21 wherein said filter is specially adapted to selectively retain permanently in said second file system said first copy of said first file.

29. The storage agent of claim 21 wherein said first file system is contained within a first enclosure and said second file system is contained within a second enclosure independent of said first enclosure.

30. The storage agent of claim 21 wherein said first file system and said second file system are both contained within a single first enclosure.

31. In a digital data processing system having a file system adapted to store at least two versions of a file, a method for managing a file archive, comprising:
- selectively storing in said file archive a copy of each of said versions of said file;
- selectively applying a predetermined graceful degradation filter to said file archive, the filter comprising at least:
  - a first criterion adapted to select for retention in said file archive the copy of the most recent version of said file; and
  - a second criterion adapted to select for retention in said file archive the copy of at least a selected one of the versions of said first file; and
- if a copy is not selected for retention by said filter, deleting said copy from said file archive.

32. The method of claim 31 wherein said filter further comprises:
- a third criterion adapted to select for retention in said file archive, from among all copies of versions of said first file stored in said file system during a first age interval, at least the copy of that version stored in said file system earliest in said first age interval.

33. The method of claim 31 wherein said filter further comprises:
- a third criterion adapted to select for retention in said file archive, from among all copies of versions of said first file stored in said file system during a first age interval, all copies of those versions stored in said file system during said first age interval.

34. The method of claim 31 wherein said filter further comprises:
- a third criterion adapted to select for retention in said file archive, from among all copies of versions of said first file stored in said file system during a first age interval, a selected subset of all copies of those versions stored in said file system during said first age interval.

* * * * *